(12) United States Patent
Hagano et al.

(10) Patent No.: US 6,913,162 B2
(45) Date of Patent: *Jul. 5, 2005

(54) TANK CAP AND TANK CAP APPARATUS

(75) Inventors: Hiroyuki Hagano, Aichi-ken (JP); Masayuki Nakagawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 78 days.

This patent is subject to a terminal disclaimer.

(21) Appl. No.: 10/342,308

(22) Filed: Jan. 15, 2003

(65) Prior Publication Data

US 2003/0102314 A1 Jun. 5, 2003

Related U.S. Application Data

(63) Continuation of application No. 09/874,366, filed on Jun. 6, 2001, now Pat. No. 6,568,553.

(30) Foreign Application Priority Data

Jun. 7, 2000 (JP) .......................... 2000-169913
Mar. 30, 2001 (JP) .......................... 2001-98077

(51) Int. Cl.⁷ ............................................. B65D 53/00
(52) U.S. Cl. ...................... 220/304; 220/293; 220/298; 220/DIG. 33
(58) Field of Search .................. 220/304, 293, 220/298, DIG. 33

(56) References Cited

U.S. PATENT DOCUMENTS

| | | |
|---|---|---|
| 3,784,047 A | 1/1974 | Cooper |
| 3,912,117 A | 10/1975 | Ryding |
| 5,031,790 A | 7/1991 | Keller |
| 5,361,924 A | 11/1994 | Muller |
| 5,529,201 A | 6/1996 | Tallent et al. |
| 5,924,590 A | 7/1999 | Jocic et al. |
| 6,079,584 A | 6/2000 | Griffin |
| 6,095,363 A | 8/2000 | Harris et al. |
| 6,109,467 A * | 8/2000 | Schliemann et al. ........ 215/330 |
| 6,173,855 B1 | 1/2001 | Stark |
| 6,202,882 B1 | 3/2001 | Hagano et al. |
| 6,230,918 B1 | 5/2001 | Huynh et al. |
| 6,308,852 B1 | 10/2001 | Hagano et al. |
| 6,568,553 B2 * | 5/2003 | Hagano et al. ............. 220/304 |

FOREIGN PATENT DOCUMENTS

| | | |
|---|---|---|
| EP | 0683108 A | 11/1995 |
| EP | 0 683 108 A2 | 11/1995 |
| EP | 0 869 023 A2 | 10/1998 |
| EP | 1004468 A | 5/2000 |
| EP | 1 004 468 A2 | 5/2000 |
| JP | 62173321 | 7/1987 |
| WO | WO 98/31598 | 7/1998 |
| WO | WO 00/20292 | 4/2000 |

* cited by examiner

*Primary Examiner*—Jes F. Pascua
(74) *Attorney, Agent, or Firm*—Posz Law Group, PLC

(57) ABSTRACT

A fuel cap (10) closes the fuel supply inlet (FNb) of a filler neck (FN) at a narrow operating angle (about 90°), improving the sealing properties of a gasket (GS). The fuel cap (10) has a cap engagement element (20a), which is brought into engagement with the opening engagement element (FNc) of the filler neck (FN), and seals the gap around the filler neck (FN) by means of the gasket (GS). The opening engagement element (FNc) is formed in an inclined state at a predetermined angle relative to the direction orthogonal to the axial direction for closing the cap. The cap engagement element (20a) has a guide surface (20b). This surface is aligned and brought into engagement with the opening engagement element (FNc) by the rotation of the fuel cap (10) in the closing direction while this element is inserted into the filler neck (FN). The guide surface (20b) has a first inclined portion (20c) with a considerable inclination $\alpha 2$, and a second inclined portion (20d) whose inclination $\alpha 1$ is less than $\alpha 2$.

6 Claims, 19 Drawing Sheets

PRIOR ART

TANK CAP AND TANK CAP APPARATUS

CROSS REFERENCE TO RELATED APPLICATIONS

The present application is a continuation of application Ser. No. 09/874,366, now U.S. Pat. No. 6,568,553, filed on Jun. 6, 2001, entitled TANK CAP AND TANK CAP APPARATUS, which is based upon and claims the benefit of Japanese Patent Application Nos. 2000-169913, filed on Jun. 7, 2000, and 2001-98077 filed on Mar. 30, 2001, the contents of which are incorporated herein by reference.

BACKGROUND OF THE INVENTION

1. Field of the Invention

The present invention relates to a tank cap to close a tank opening member and a tank cap apparatus with the tank cap attached thereto.

2. Description of Related Art

In conventional practice, tank caps are configured such that a fuel supply port is closed by rotating a fuel cap fitted with a gasket several times relative to a filler neck connected to a fuel tank. Since rotating the fuel cap a plurality of times sometimes fails to result in a tight fit, closing the fuel supply port of a filler neck with a fuel cap merely by turning the cap through a predetermined angle (for example, about 90°) has been proposed as a way of overcoming this shortcoming.

FIG. 24 is a diagram depicting the state existing before a fuel cap is mounted over a filler neck. The fuel cap 100 comprises a casing main body 102 for opening and closing the fuel supply inlet FNb of a filler neck FN, a cover 104 mounted on the casing main body 102, and a gasket GS mounted in the upper portion of the casing main body 102. A ratchet mechanism (not shown) is interposed between the casing main body 102 and the cover 104 to ensure that the cover 104 idles relative to the casing main body 102 when excessive torque is applied between the cover 104 and the casing main body 102.

A casing engagement element 102a is also formed in the lower portion of the outer circumference of the casing main body 102. An opening engagement element FNc is further formed in the inner circumferential portion of the filler neck FN. Part of the area around the inside of the opening engagement element FNc is provided with a neck insertion notch FNd for allowing the casing engagement element 102a of the fuel cap 100 to be inserted in the axial direction.

FIG. 25 is a diagram depicting the manner in which the fuel cap 100 is mounted over the filler neck FN. The opening engagement element FNc is tapered by a prescribed inclination α in the axial direction, and the guide surface 102b of the casing engagement element 102a is tapered to match this angle.

The manner in which the inlet FNb of FN is closed with the fuel cap 100 will now be described. The casing engagement element 102a is positioned in the neck insertion slot FNd, and the fuel cap 100 is turned through a predetermined angle (about 90°) while the fuel cap 100 is inserted into the filler neck FN. By this, the fuel cap 100 is mounted over the filler neck FN as a result of the fact that the casing engagement element 102a is caused to align with and engage the opening engagement element FNc. At the same time, the gasket GS is compressed between the casing main body 102 and the filler neck FN, forming a seal. If rotated further, the cover 104 will idle due to the presence of the ratchet mechanism, signaling that the limit has been reached and indicating that the fuel cap 100 fits tightly over the inlet FNb.

Reducing the inclination α of the opening engagement element FNc during the closure of the fuel cap 100 will increase the operating angle of the fuel cap 100, not only making the cap more difficult to operate but also allowing the fuel cap 100 to occasionally rotate through an angle greater than 180° and come off. Conversely, increasing the inclination α will increase the tightening rate of the gasket GS (that is, the extent to which the gasket GS is compressed) and will enhance the rubber recoil of the gasket GS. For this reason, the rotational torque will increase and the cover will be idled by the ratchet mechanism before the gasket GS is adequately compressed, making it impossible to form a tight seal.

This approach is thus disadvantageous in the sense that it is difficult to cause the gasket GS to form a tight seal by rotating the fuel cap 100 through a narrow operating angle (about 90°). In addition, considerable load is applied between the opening engagement element FNc and the corner 102c of the casing engagement element 102a when the corner 102c is pressed against the opening engagement element FNc. A greater rotational torque is therefore needed to close the fuel cap 100, sometimes making it impossible to close the cover properly and form a tight seal.

SUMMARY OF THE INVENTION

One aspect of the present invention provides a tank cap apparatus in which a seal member can form a better seal with a small operating angle.

In accordance with one embodiment of the present invention, a tank cap apparatus comprises a tank opening member having an opening engagement element and a cap constructed and arranged to close the tank opening member through rotation. The cap includes a cap engagement element for engaging the opening engagement element and a gasket interposed between the cap and a sealing surface of the tank opening member and constructed and arranged to seal the gap therebetween. The opening engagement element is inclined at a predetermined angle relative to a direction orthogonal to an axial direction for closing the cap and the cap engagement element has a guide surface for engaging the opening engagement element by a rotation of the cap in a closing direction while the cap is inserted into the tank opening member. An angle of the guide surface decreases with a rotation of the cap in the closing direction.

In the tank cap apparatus according to the present invention, inserting the cap into the tank opening member and rotating the cap in the closing direction will seal the gap between the cap and the tank opening member. This is because a cap engagement element will engage and fit over an opening engagement element, and the seal member interposed between the cap and the tank opening member will be compressed.

During cap closure, the guide surface of the cap engagement element aligns with and engages the opening engagement element. The guide surface is configured such that the angle thereof diminishes as the cap is rotated in the closing direction during this process. Specifically, the configuration is selected such that the inclination is greater in the initial stage. Despite the fact that the inclination of the guide surface is thus increased in the initial stage and the tightening rate is kept at a higher level, the torque is prevented from becoming excessively high and the seal member can be provided with an adequate tightening margin because the seal member produces only a weak reaction force during the initial compression stage of the seal member. When the seal member is compressed past the initial stage, the guide surface acquires a lesser angle and becomes capable of consistently providing a better seal in a state in which the tightening rate of the seal member is reduced.

Accordingly, aligning the steeply inclined guide surface with the opening engagement element during the initial compression stage of the seal member makes it possible to provide the seal member with an adequate tightening margin (and hence to obtain a tight seal) without creating a strong reaction force even in the case of a narrow rotation angle.

As a preferred embodiment of such a guide surface, a simple structure can be formed by providing a first inclined portion configured at an inclination whose angle with respect to the direction orthogonal to the axial direction is greater than the angle of the opening engagement element, and providing a second inclined portion formed as a continuation of the first inclined portion and inclined at an angle substantially equal to the aforementioned predetermined angle. The cap engagement element can be easily formed with high precision by being injection-molded monolithically with the casing main body despite being configured with a slightly varying incline in order to obtain the first and second inclined portions. In addition to the configuration in which the second inclined portion is formed as a surface that continues past the first inclined portion, it is also possible to adopt a configuration in which a third inclined portion is provided at an inclination that is intermediate between those of the first and second inclined portions.

According to another embodiment of the guide surface, it is possible to provide a structure in which the angle of inclination relative to the direction orthogonal to the axial direction is greater than the predetermined angle of the opening engagement element. In addition to being fashioned as a planar surface of constant inclination, the guide surface may also be fashioned as a curved surface or configured in accordance with a variety of other possible embodiments in which a continuously varying inclination is adopted.

Preferred embodiments of the seal member include C-rings, O-rings, and various other types of seal members characterized by exerting weak reaction force when compressed in the initial stage.

In accordance with another embodiment of the preset invention, a tank cap for closing a tank opening member provided with an opening engagement element formed in an inclined state at a predetermined angle comprises a casing main body including a flange formed in an upper portion of the casing main body, a gasket holder disposed underneath the flange, and a cap engagement element formed underneath the gasket holder. The gasket is held by the gasket holder and seals a gap around a sealing surface of the tank opening member. The cap also includes a cover rotatably mounted over the flange. The cap engagement element has a guide surface for engaging the opening engagement element by a rotation of the cap in a closing direction while the cap is inserted into the tank opening member. An angle of the guide surface decreases with a rotation of the cap in the closing direction.

In the tank cap apparatus according to the present invention, inserting the cap into the tank opening member and rotating the cap through an angle 180° or less in the closing direction will cause a cap engagement element to engage and fit into an opening engagement element and to seal the gap between the cap and the tank opening member by compressing the gasket interposed between the cap and the sealing surface of the tank opening member.

As the cap engagement element projects from the outer circumference of the cap, a gap is left between the outer circumferential surface of the cap and the inner wall of the tank opening member in the area not covered by the cap engagement element, but this gap is filled with a tilt-preventing rib. An outside cap-tilting force pushes the tilt-preventing rib against the inner wall of the tank opening member, allowing the cap to tilt only slightly. Accordingly, the gasket retains its sealing properties without undergoing excessive plastic deformation.

It is also possible to adopt a structure in which the tilt-preventing rib is disposed above the area not covered by the cap engagement element. Furthermore, the arrangement in which the tilt-preventing rib is formed around the entire cap periphery can be abandoned in favor of an arrangement in which the rib is provided in divided form at locations that are best suited for the prevention of cap tilting. In addition, extending the tilt-preventing rib to a height substantially equal to or greater than the radial height of the cap engagement element causes the rib to come into contact with the inner wall of the tank opening member and to prevent the cap from tilting and the cap engagement element from coming into contact with the inner wall of the tank opening member when a cap-tilting force is applied.

According to another embodiment of the invention, there is provided a tank cap for closing a tank opening member by rotating the cap through an angle of 180° or less to bring the cap into engagement with an opening engagement element formed on the inner wall of the tank opening member, wherein this cap comprises a casing main body comprising a flange formed in the upper portion thereof, a gasket holder disposed underneath the flange, and a cap engagement element fashioned as a projection underneath the gasket holder. The cap also comprises a gasket held by the gasket holder and designed to seal the gap around the sealing surface of the tank opening member and a cover rotatably mounted over the flange. The casing main body further comprises a tilt-preventing rib formed as a projection on the outer circumferential portion of the casing main body above the cap engagement element but below the gasket, and designed to come into contact with the inner wall of the tank opening member and to prevent the casing main body from tilting upon application of a force that tends to tilt the casing main body.

In addition to the means whereby the cap and the opening engagement elements are engaged merely by being rotated through an angle of 180° or less, a torque mechanism for achieving an engagement through a prescribed rotational torque can be provided as a means whereby the cap engagement element is brought into engagement with the opening engagement element by rotating the tank cap through an angle of 180° or less.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
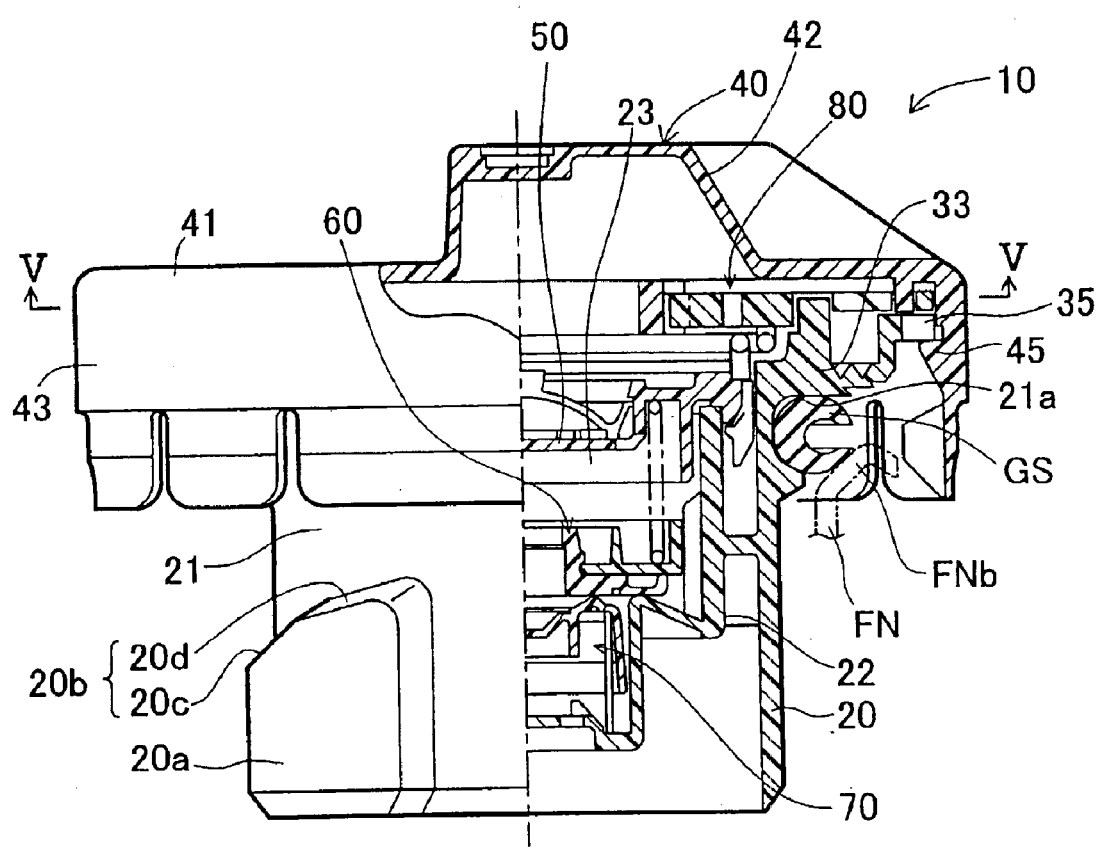
FIG. 1 is a side view in partial section illustrating a tank cap in a first embodiment according to the present invention.

FIG. 1 is a partial sectional view illustrating a fuel cap 10 in a first embodiment according to the present invention. The fuel cap 10 is attached to a filler neck FN having a fuel supply inlet FNb (tank opening member), through which a supply of fuel is fed to a fuel tank (not shown). The fuel cap 10 includes a casing main body 20 preferably made of a synthetic resin material such as polyacetal, a cover 40 mounted on an upper portion of the casing main body 20, which is preferably made of a synthetic resin material, such as nylon, and works like a handle, an inner cover 50 that closes an upper opening of the casing main body 20 to define a valve chest 23, a positive pressure valve 60, and a negative pressure valve 70 that are accommodated in the valve chest 23 and work as pressure control valves, a torque mechanism 80, and a gasket GS set on an upper circumference of the casing main body 20 to seal the casing main body 20 against the filler neck FN.

The elements of the fuel cap 10 in this embodiment are described in detail below. The casing main body 20 has a substantially cylindrical outer tubular body 21 with a casing engagement element 20a, which engages with an another engagement element disposed at inner circumference of the filler neck FN, and a valve chest-forming body 22 that is disposed inside the outer tubular body 21. The valve chest-forming body 22 defines the valve chest 23, in which the positive pressure valve 60 and the negative pressure valve 70 are accommodated.

Figure 2:
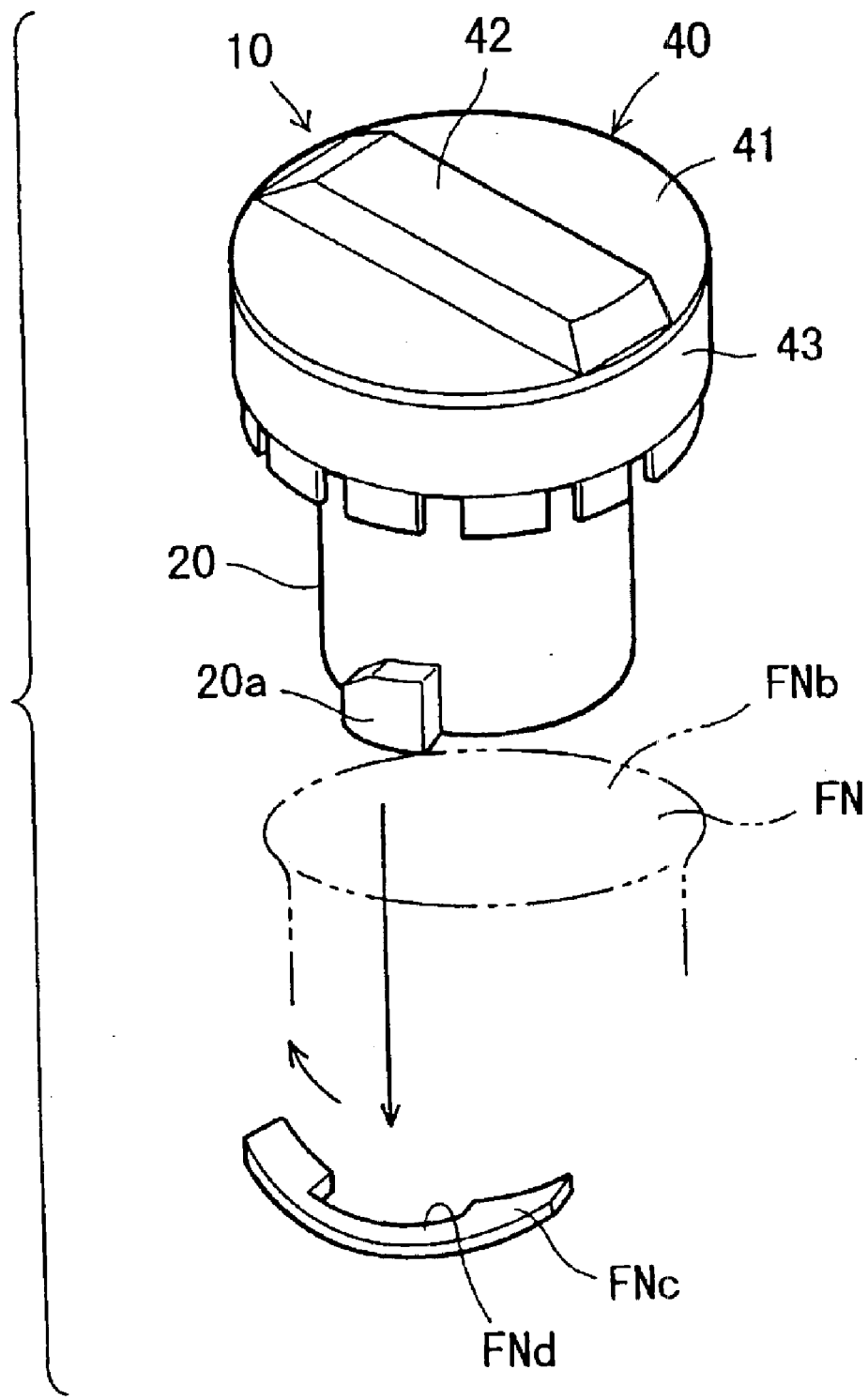
FIG. 2 is an exploded view that shows a casing engagement element of the casing main body that engages with a filler neck.

The gasket GS is mounted on the lower surface of a flange 33 formed in the upper portion of the casing main body 20. The gasket GS is interposed between a seal support 21a of the flange 33 and the fuel supply inlet FNb of the filler neck FN. When the fuel cap 10 is fit into the fuel supply inlet FNb, the gasket GS is pressed against the seal support 21a to exert the sealing effect. The casing engagement element 20a is formed in the lower portion on the outer circumference of the outer tubular body 21. FIG. 2 shows the casing engagement element 20a of the casing main body 20 that engages with the filler neck FN. An opening engagement element FNc is formed on the inner circumference of the filler neck FN. A neck insertion notch FNd is formed in a part of the inner circumferential portion of the opening engagement element FNc in order to receive the casing engagement element 20a of the fuel cap 10, which is axially inserted into the fuel supply inlet FNb of the filler neck FN.

Figure 3:
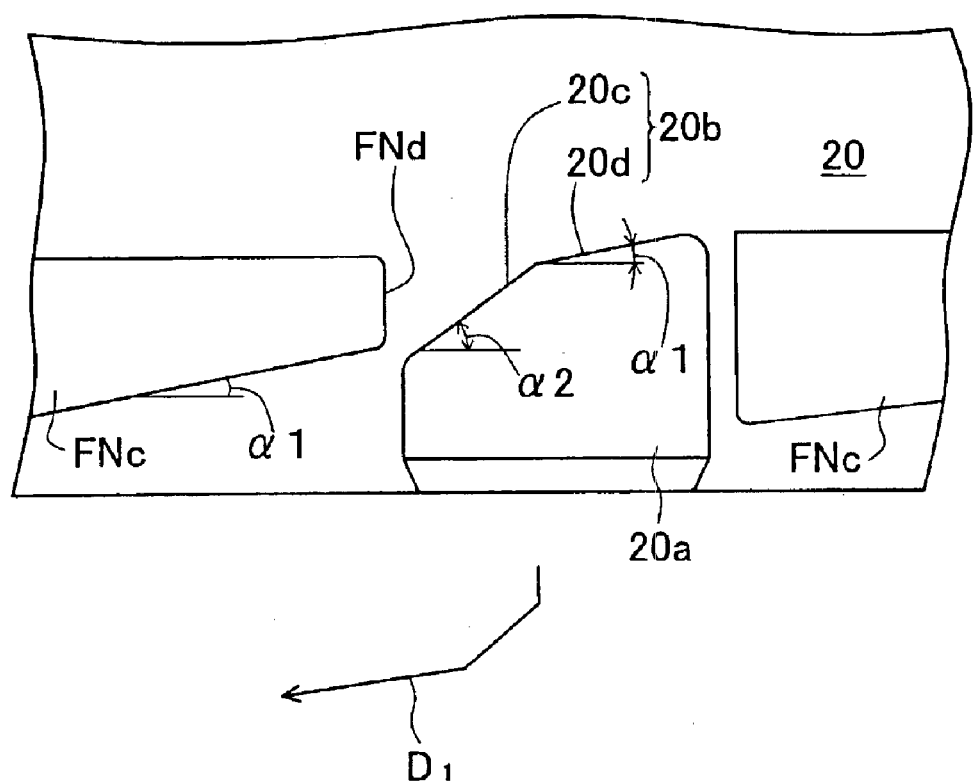
FIG. 3 is and enlarged partial side view that shows a casing engagement element of the casing main body that engages with a filler neck.

FIG. 3 is a diagram depicting the relation between the opening engagement element FNc and the cap engagement element 20a extending from the outer circumferential surface of the casing main body 20. The opening engagement element FNc is formed at a first inclined angle α1 relative to the direction orthogonal to the axial direction in which the fuel cap 10 is advanced and retracted. The cap engagement element 20a is provided with a guide surface 20b. The guide surface 20b comprises a first inclined portion 20c, which is formed at a second angle α2 greater than the first angle α1, and a second inclined portion 20d, which is formed as a continuation of the first inclined portion 20c and is inclined at an angle equal to the first angle α1. Thus, the cap engagement element 20a has a generally tapered or trapezoidal shape.

Turning the fuel cap 10 by a predetermined angle (about 90°) while the cap engagement element 20a is disposed in the neck insertion notch FNd and the fuel cap 10 is inserted into the filler neck FN causes the cap engagement element 20a to move in the direction of arrow D1 and to engage the lower surface of the opening engagement element FNc, whereby the fuel cap 10 is mounted over the filler neck FN. The reason that the guide surface 20b comprises the first inclined portion 20c and the second inclined portion 20d will be described below with reference to the operation involving the opening and closing of the fuel cap 10.

Figure 4:
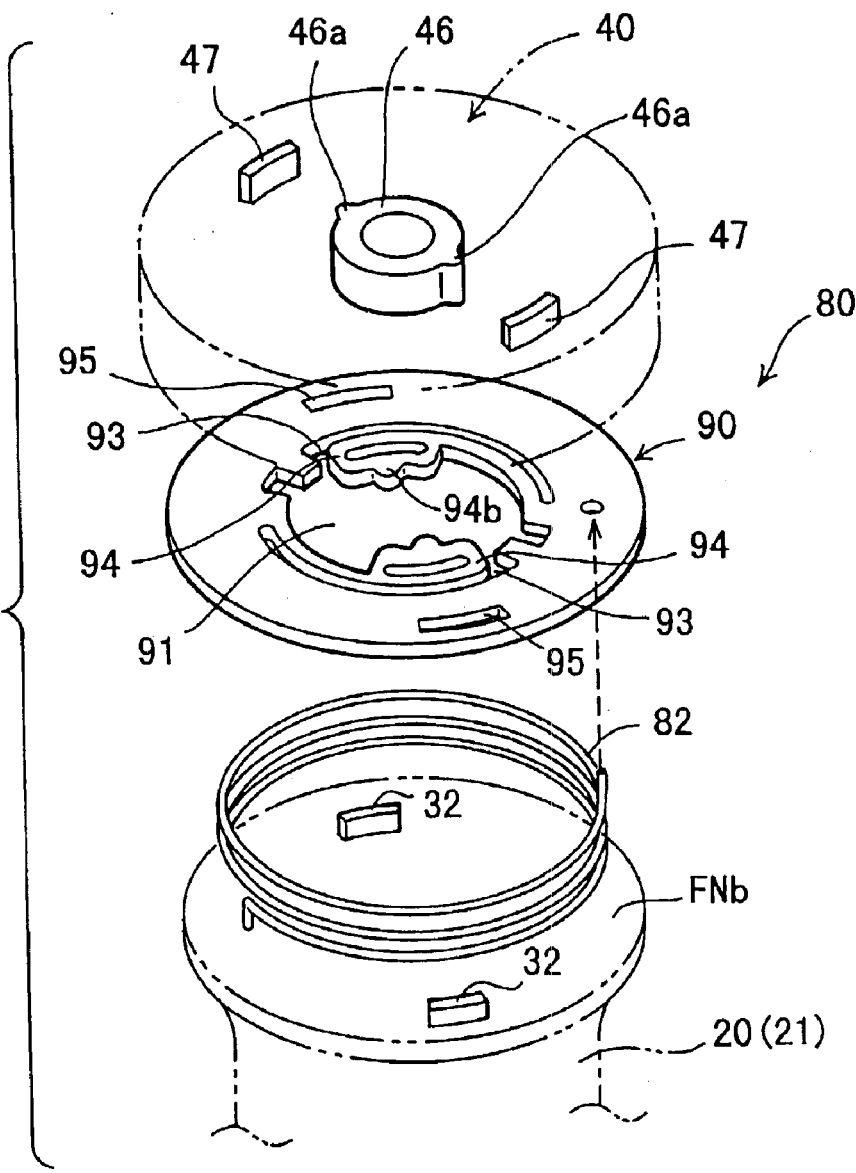
FIG. 4 is an exploded perspective view illustrating a cover and a torque mechanism disposed in the upper portion of the casing main body.
Figure 6:
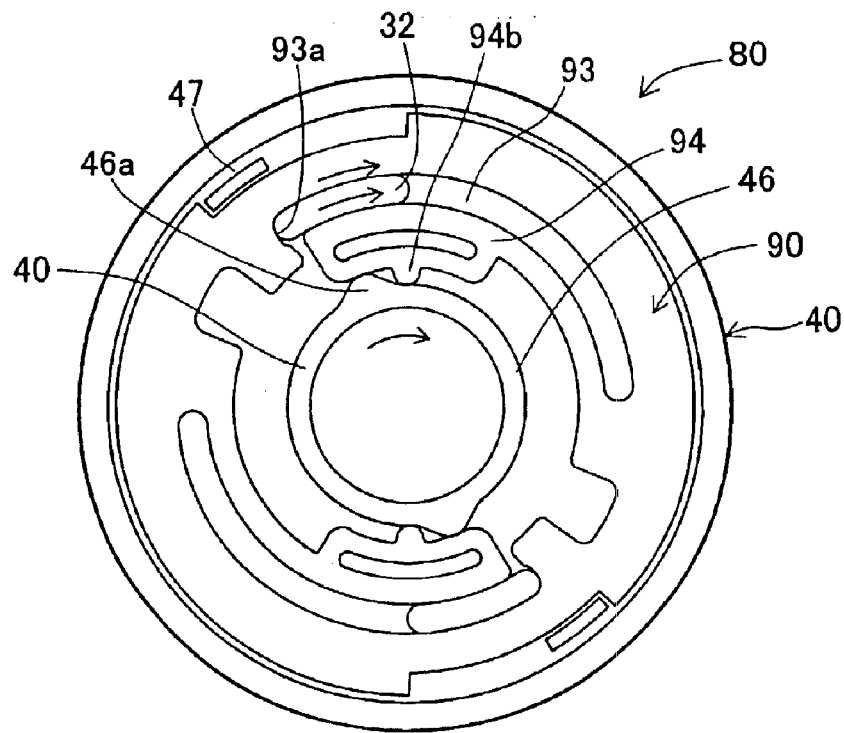
FIG. 6 is a schematic diagram that shows an initial state in a series of operations of the torque mechanism in the first embodiment.

FIG. 4 is an exploded perspective view illustrating the cover 40 and the torque mechanism 80 disposed in the upper portion of the casing main body 20. FIG. 6 is a schematic sectional view illustrating the torque mechanism 80, taken on the line V—V in FIG. 1. The torque mechanism 80 gives the user a feeling of attachment by an audible click when the rotational torque of a predetermined level or more is applied to the cover 40 when closing the fuel supply inlet FNb with the fuel cap 10. The user can thus confirm that the fuel cap 10 is attached to the filler neck FN with the rotational torque of the predetermined level or more.

Referring back to FIG. 1, the cover 40 is detachably attached to the flange 33 of the casing main body 20 in a rotatable manner. The cover 40 shown in FIGS. 1 and 2 includes a disc plate 41, a handle 42 that protrudes upward from the disc plate 41, and a side wall 43 integrally formed around the disc plate 41. The respective sections 41, 42, 43 of the cover 40 are preferably made of a conductive resin and are preferably integrally formed by injection molding. Of course, as with any of the e.emants described herein, other suitable materials and bethods of formation may be used. Eight engagement projections 45 are formed at an interval around the inner circumference of the side wall 43. The engagement projections 45 engage with the outer ring 35 of the flange 33 (FIG. 1), so that the cover 40 is joined with the casing main body 20.

Figure 5:
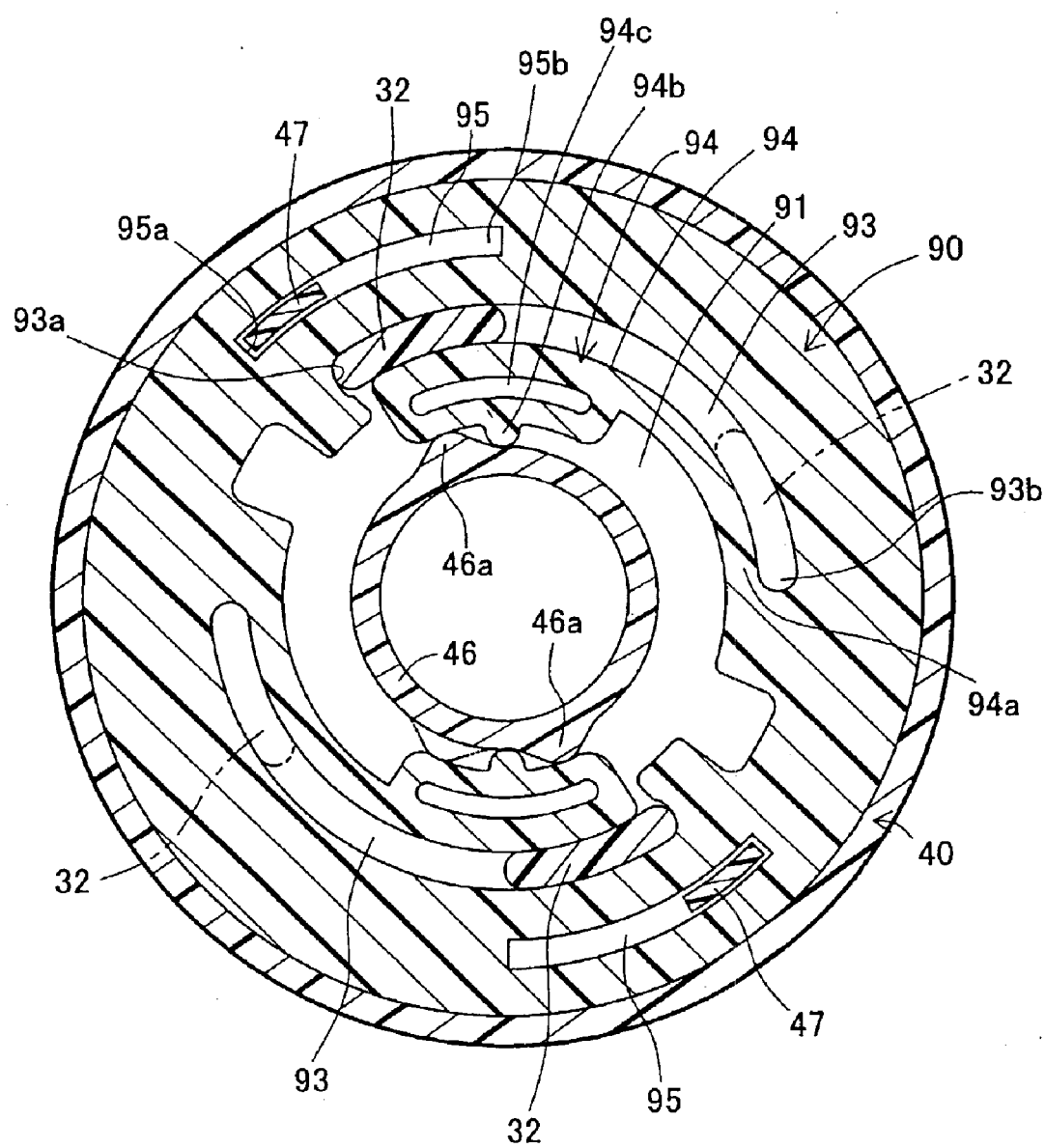
FIG. 5 is a sectional view illustrating the torque mechanism, taken on the line V—V in FIG. 1.

Referring to FIGS. 4 and 5, the torque mechanism 80 includes a pair of main body ribs 32, 32 that protrude upward from the upper surface of the outer tubular body 21 of the casing main body 20, a cylindrical shaft 46, a pair of cover engagement projections 46a, 46a formed on the surface of the cylindrical shaft 46, a pair of cover trigger projections 47, 47 formed on the lower surface of the cover 40, a spring 82, and a torque plate 90. The cylindrical shaft 46 protrudes from the center of the lower surface of the cover 40. The pair of cover engagement projections 46a, 46a project from the outer circumferential surface of the cylindrical shaft 46. The pair of arc-shaped cover trigger projections 47, 47 protrude from the lower surface of the cover 40. The pair of cover engagement projections 46a, 46a and the pair of cover trigger projections 47, 47 are arranged symmetrically around the rotational shaft of the cover 40.

The spring 82 is a coil spring interposed between the casing main body 20 and the torque plate 90. The spring 82 spans between the upper portion of the casing main body 20 and the outer circumferential portion of the torque plate 90 and accumulates the pressing force therein when the torque plate 90 is rotated counterclockwise relative to the casing main body 20. Of course, other suitable biasing mechanisms could be employed.

Referring to FIG. 5, the torque plate 90 is a thin disk plate preferably made of a resin, and has a through-hole and guide slots. The torque plate 90 has a center aperture 91 formed on the center thereof, a pair of rib guides 93, 93 arranged concentrically with the center aperture 91, and a pair of trigger guide slots 95, 95 arranged outside the rib guides 93, 93 and concentrically with the center aperture 91. The cylindrical shaft 46 of the cover 40 passes through the center aperture 91. A pair of elastic torque pieces 94, 94 are formed around the circumference of the center aperture 91. Each elastic torque piece 94, 94 is a cantilever arc piece that extends from a support end 94a, and has a plate engagement element 94b that protrudes toward the center of the aperture 91 and a slot 94c formed on the outer circumferential side of the plate engagement element 94b. The elastic torque piece 94 is elastically deformed to narrow the slot 94c, when the plate engagement element 94b is pressed against the cover engagement projection 46a of the cover 40 (see FIG. 7).

The pair of main body ribs 32, 32 fit in the pair of rib guides 93, 93 arranged outside the pair of elastic torque pieces 94, 94. Each of the main body ribs 32, 32 moves forwards and backwards along the rib guides 93, 93 between a first end 93a and a second end 93b of the rib guide 93. The pair of cover trigger projections 47, 47 fit in the pair of trigger guide slots 95, 95. Each of the cover trigger projections 47, 47 moves forwards and backwards along the trigger guide slot 95 between a first end 95a and a second end 95b of the trigger guide slot 95.

The following describes operation of the torque mechanism 80 in the process of opening and closing the fuel supply inlet FNb of the filler neck FN with the fuel cap 10. The torque mechanism 80 has pairs of elements symmetrically arranged around the rotational axis of the cover 40, although the following description generally refers to only one of each pair of elements for purposes of clarity of explanation only.

The user may hold the handle 42 of the cover 40 (FIG. 2) with a thumb and an index finger, position the casing engagement element 20a formed on the casing main body 20 at the neck insertion notch FNd of the filler neck FN, and insert the casing main body 20 in the axial direction into the open fuel supply inlet FNb of the filler neck FN. When the handle 42 of the cover 40 is located in the vertical direction, the handle 42 of the cover 40 is designed to make the casing engagement element 20a readily fit in the neck insertion notch FNd and facilitate the attachment of the fuel cap 10 to the filler neck FN. As shown in FIG. 6, in the torque mechanism 80, the pressing force of the spring 82 causes the main body rib 32 to press against the first end 93a of the rib guide 93 and causes the cover engagement projection 46a of the cover 40 to contact the plate engagement element 94b of the torque plate 90

Figure 7:
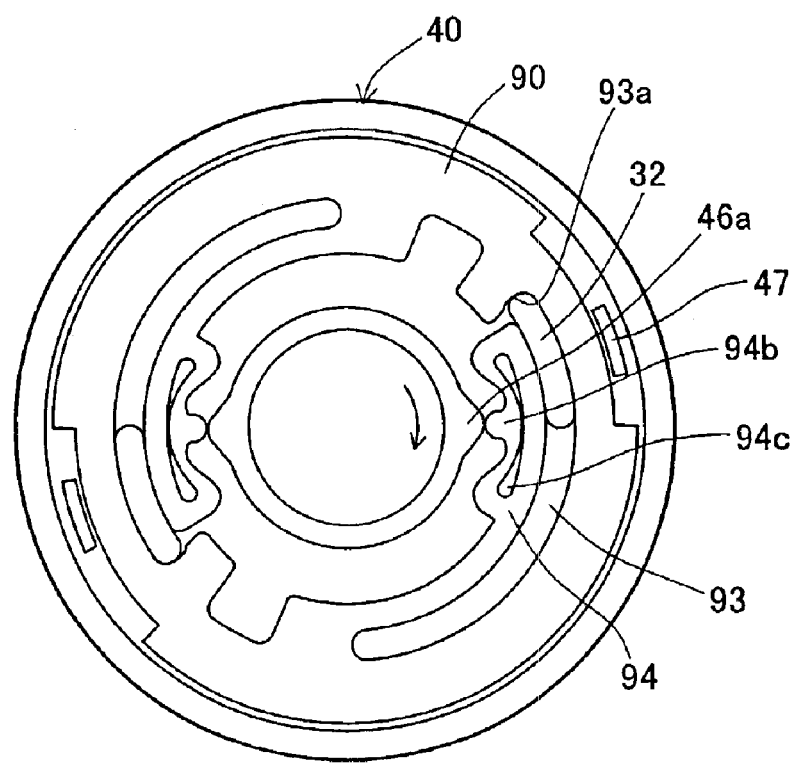
FIG. 7 is a schematic diagram that shows a state subsequent to the state of FIG. 6 in the series of operations of the torque mechanism of the first embodiment.
Figure 8:
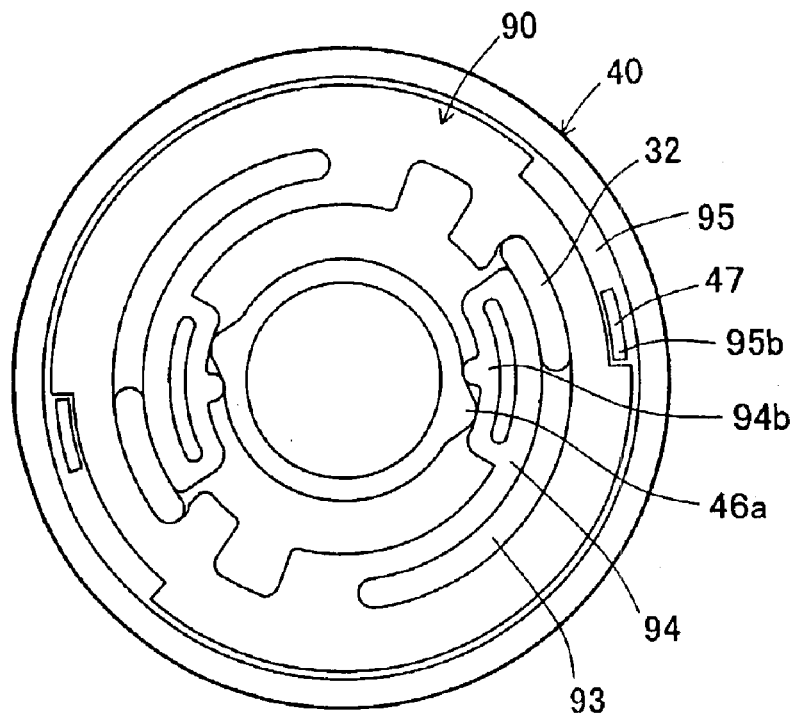
FIG. 8 is a schematic diagram that shows a state subsequent to the state of FIG. 7 in the series of operations of the torque mechanism of the first embodiment.

A clockwise rotational force is applied to the cover 40 in the above state to close the fuel supply inlet FNb of the filler neck FN with the fuel cap 10. The torque mechanism 80 carries out a series of processes, as shown in FIGS. 6 through 9. The clockwise rotational force applied to the cover 40 is transmitted to the torque plate 90 through the engagement of the cover engagement projection 46a of the cover 40 with the plate engagement element 94b of the torque plate 90 to rotate the torque plate 90 clockwise. The clockwise rotation of the torque plate 90 presses the main body rib 32 of the casing main body 20 against the first end 93a of the rib guide 93 formed in the torque plate 90. This causes the cover 40, the torque plate 90, and the casing main body 20 to rotate integrally in the closing direction of the fuel supply inlet FNb. Accordingly, the force of engaging the casing engagement element 20a of the casing main body 20 with the opening engagement element FNc of the filler neck FN is enhanced. When a reaction force generated by the engagement force becomes equal to or greater than a predetermined rotational torque, the cover engagement projection 46a rides over the plate engagement element 94b, as shown in FIG. 7, to a first non-engaged state, shown in FIG. 8. This process to the first non-engaged state gives the user a feeling of attachment through an audible click. The fuel supply inlet FNb of the filler neck FN is accordingly closed with the fuel cap 10 under a predetermined clamping torque.

Figure 11:
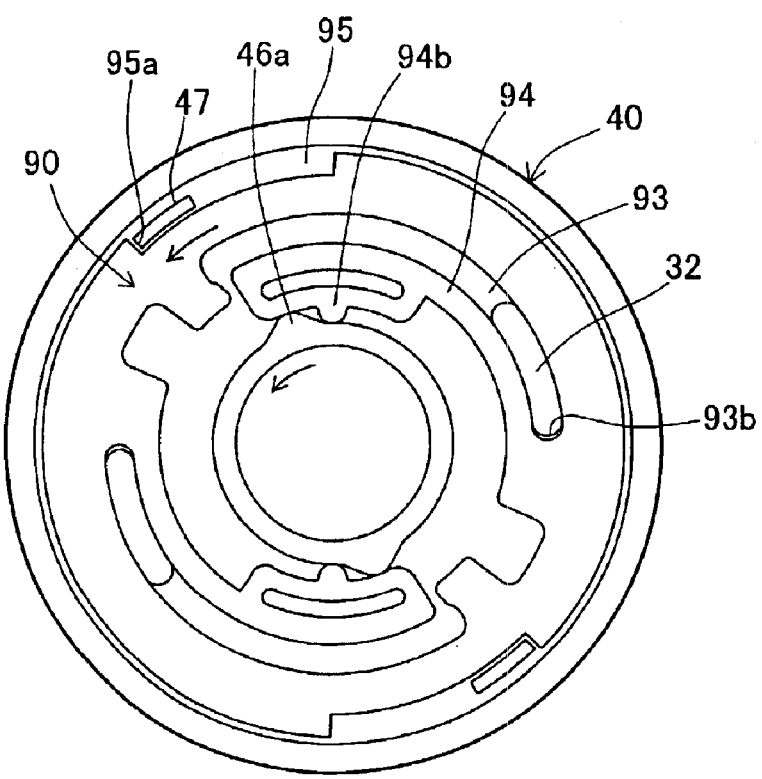
FIG. 11 is a schematic diagram that shows a state subsequent to the state of FIG. 10 in the series of operations of the torque mechanism of the first embodiment.

In order to release the fuel cap 10 and open the fuel supply inlet FNb of the filler neck FN, on the other hand, the user holds the handle 42 of the cover 40 with the thumb and the index finger and applies a counterclockwise rotational force to the cover 40, as shown in FIG. 11. The counterclockwise rotational force applied to the cover 40 causes the cover engagement projection 46a of the cover 40 to press against the plate engagement element 94b of the torque plate 90. Since the casing main body 20 is attached to the filler neck FN, only the cover 40 and the torque plate 90 are rotated counterclockwise against the pressing force of the spring 82. With the counterclockwise rotation of the cover 40 and the torque plate 90, the main body rib 32 moves along the rib guide 93 towards the second end 93b thereof.

Figure 9:
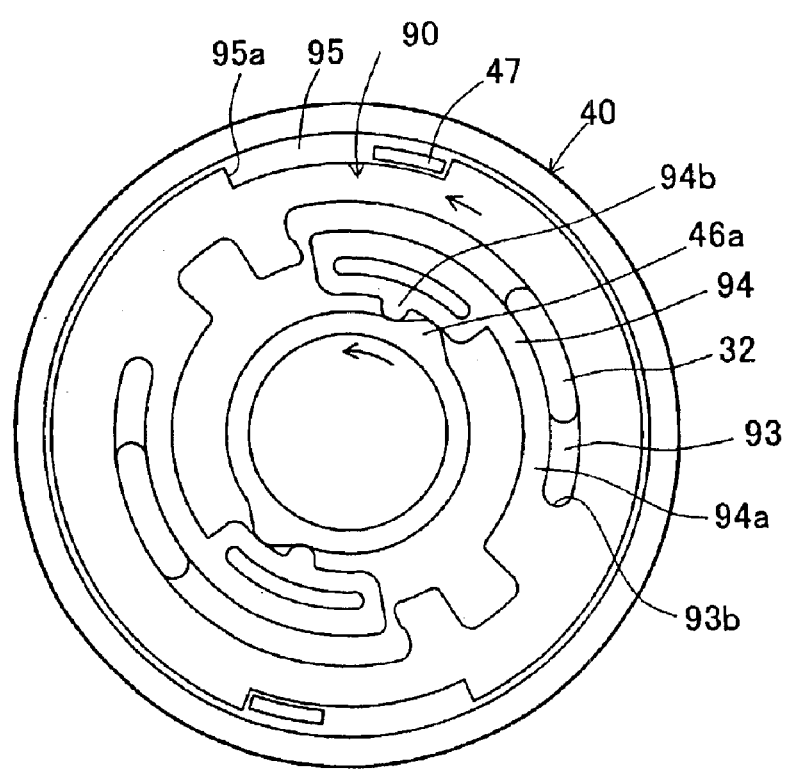
FIG. 9 is a schematic diagram that shows a state subsequent to the state of FIG. 8 in the series of operations of the torque mechanism of the first embodiment.
Figure 10:
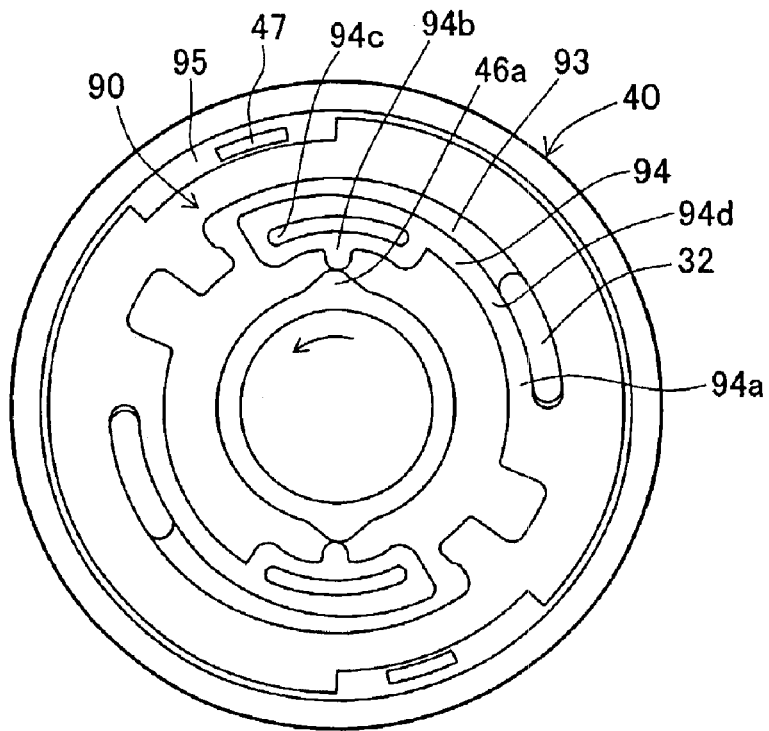
FIG. 10 is a schematic diagram that shows a state subsequent to the state of FIG. 9 in the series of operations of the torque mechanism of the first embodiment.

The elastic torque piece 94 is easily deflected when the main body rib 32 is not positioned on the free end of the elastic torque piece 94, as shown in FIG. 9. A further counterclockwise rotation of the cover 40, as shown in FIG. 10, causes the cover engagement projection 46a to press against the plate engagement element 94b and elastically deform the elastic torque piece 94. The elastic deformation of the elastic torque piece 94 significantly deflects a part 94d that contacts the main body rib 32 and varies the width of the slot 94c. This causes the cover engagement projection 46a to ride over the plate engagement element 94b with a smaller pressing force and results in a second non-engaged state, as shown in FIG. 11. Namely, the cover engagement projection 46a rides over the plate engagement element 94b under a smaller rotational torque than the rotational torque required in the closing process of the fuel cap 10 discussed above.

A counterclockwise rotation of the cover 40 to the position where the cover engagement projection 46a rides over the plate engagement element 94b causes the cover trigger projection 47 to press against the first end 95a of the torque plate 90. In this state, the main body rib 32 presses against the second end 93b of the rib guide 93. The rotational force applied to the cover 40 is accordingly transmitted to the casing main body 20 via the cover trigger projection 47, the torque plate 90, the second end 93b of the rib guide 93, and the main body rib 32. This causes the cover 40, the torque plate 90, and the casing main body 20 to rotate counterclockwise integrally.

Figure 12:
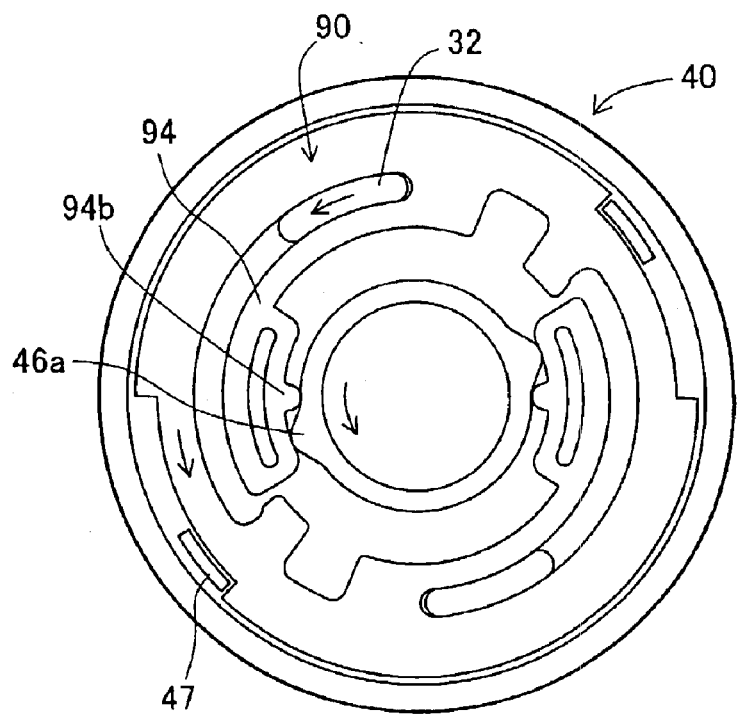
FIG. 12 is a schematic diagram that shows a state subsequent to the state of FIG. 11 in the series of operations of the torque mechanism of the first embodiment.
Figure 13:
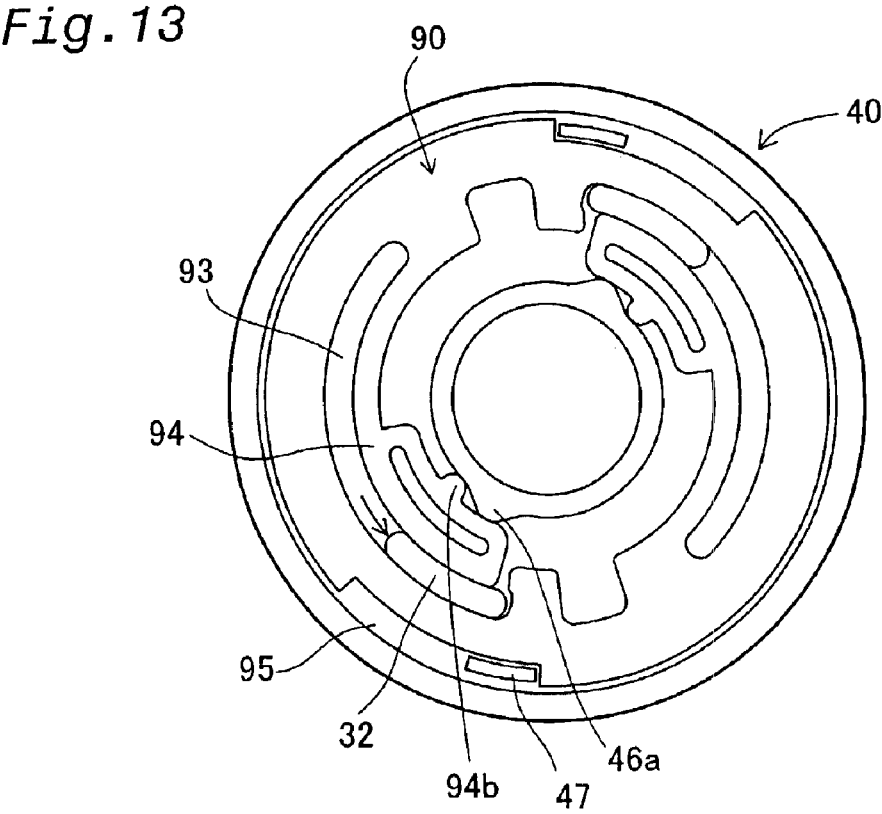
FIG. 13 is a schematic diagram that shows a state subsequent to the state of FIG. 12 in the series of operations of the torque mechanism of the first embodiment.

The rotation of the casing main body 20 integrally with the cover 40 by approximately 90 degrees (the state of FIG. 12) causes the casing engagement element 20a to be released from the opening engagement element FNc of the filler neck FN. The casing main body 20 is accordingly released from the restraint force to the filler neck FN. As the casing main body 20 receives the pressing force of the spring 82 and the cover 40 is held between the thumb and a finger of the user, the casing main body 20 rotates counterclockwise relative to the cover 40 and the torque plate 90 and returns to the initial position (the state of FIG. 13). Here, the positional relationship between the handle 42 of the cover 40 and the casing engagement element 20a of the casing main body 20 returns to the initial state.

The user has a feeling of attachment through an audible click when the cover engagement projection 46a rides over the plate engagement element 94b in the process of closing the fuel cap 10. This assures the user that the fuel cap 10 is clamped under a predetermined torque. Namely, the fuel cap 10 is clamped under a fixed torque, irrespective of the elasticity of the gasket GS.

Since the engagement of the casing engagement element 20a with the opening engagement element FNc requires rotation of the fuel cap 10 only approximately 90 degrees, a plurality of rotating actions by a user is not required to attach the fuel cap 10 to the filler neck FN.

In the torque mechanism 80 of the embodiment, when a counterclockwise rotational torque is applied to the cover 40 to open the fuel cap 10, the plate engagement element 94b and the cover engagement projection 46a fall into the second non-engaged state, which requires a smaller rotational torque than the first non-engaged state. This does not interfere with the accumulation of the pressing force in the spring 82. The accumulated pressing force enables the positional relationship between the cover 40 and the casing main body 20 to return to the initial state.

Since this arrangement facilitates the positioning of the handle 42 of the cover 40 and the casing engagement element 20a of the casing main body 20 in the process of closing the fuel cap 10, the fuel supply inlet FNb of the filler neck FN is readily closed with the fuel cap 10.

The operation for bringing the cap engagement element 20a into engagement with the opening engagement element FNc during the closure of the fuel cap 10 will now be described with reference to FIGS. 14A–D. FIGS. 14A–D are diagrams depicting a series of operations for bringing the cap engagement element 20a into engagement with the opening engagement element FNc. When the fuel cap 10 is inserted into the filler neck FN, the cap engagement element 20a enters the neck insertion notch FNd. In other words, a condition is established in which the element passes through the state shown in FIG. 14A and penetrates deep into the notch in the manner shown in FIG. 14B.

Figure 14A:
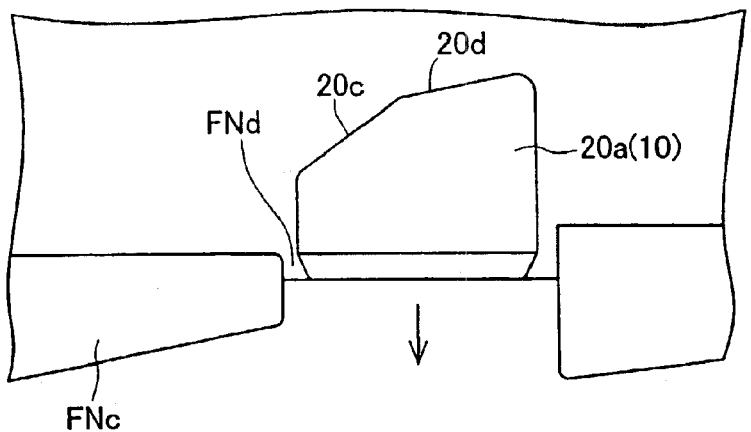
FIGS. 14A, 14B, 14C, and 14D are partial enlarged side view diagrams depicting a series of operations for bringing the cap engagement element into engagement with the opening engagement element.
Figure 14B:
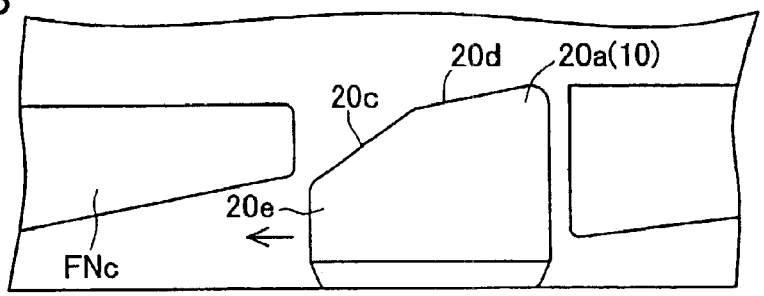
Figure 14C:
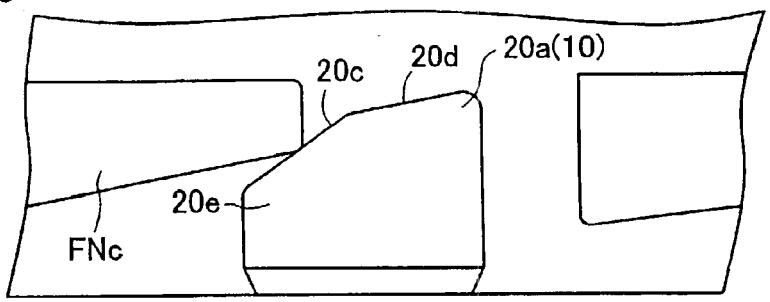
Figure 14D:
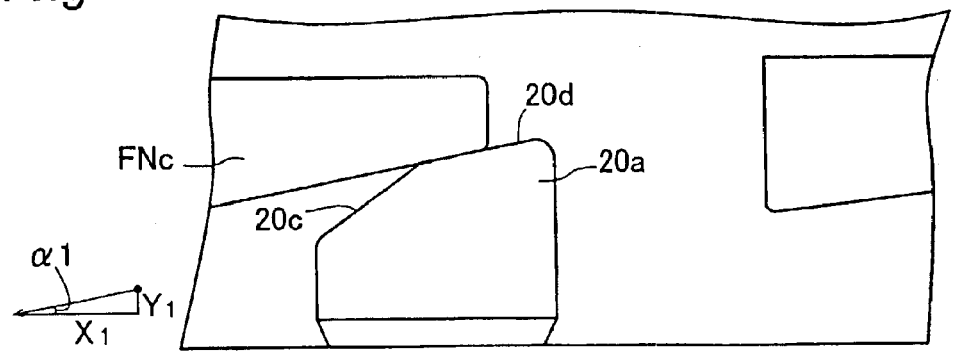

When the fuel cap 10 is subsequently rotated clockwise, the first inclined portion 20c is aligned with the opening engagement element FNc, as shown in FIG. 14C (first engagement step). Further clockwise rotation of the fuel cap 10 causes the second inclined portion 20d to move in alignment with the opening engagement element FNc (as shown in FIG. 14D), and the fuel cap 10 to close the fuel supply inlet FNb of the filler neck FN (second engagement step).

Assuming now that x is the distance traveled by the cap engagement element 20a in the direction of rotation and y is the distance traveled in the axial direction, the corresponding tightening rate TR can be defined as y/x. Assuming that the distances traveled in the direction of rotation in the first and second engagement steps are x1 and x2, and the distances traveled in the axial direction are y1 and y2, the corresponding tightening rates can be defined as TR1 and TR2, respectively, as represented in FIGS. 14C and 14D. At this time, the second angle α2 of the first inclined portion 20c is greater than the first angle α1 of the second inclined portion 20d, so the tightening rate TR1 of the first engagement step is greater than the tightening rate TR2 of the second engagement step. Described below are the reasons that the tightening rate TR1 is set high in the initial first engagement step, and the tightening rate TR2 is set low in the second engagement step.

Figure 15:
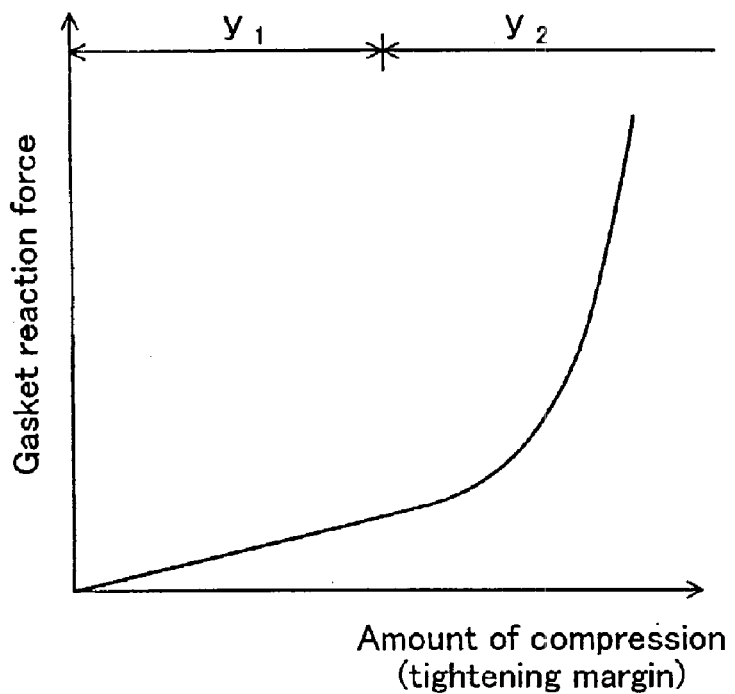
FIG. 15 is a graph showing the relation between gasket reaction and the amount of compression (tightening margin) during gasket flattening.

FIG. 15 is a graph showing the relation between gasket reaction and the amount of compression (tightening margin) during gasket flattening. The gasket reaction in FIG. 15 gradually increases during initial compression and then rises sharply during subsequent compression. This indicates that a weak force is sufficient to achieve considerable gasket compression in the initial stage, but a strong force is needed to sustain such compression after a certain level of compression has been achieved.

When the fuel cap 10 is closed by utilizing the gasket properties illustrated in FIG. 15, the gasket GS exerts a weak reaction force and the torque mechanism 80 does not cause any slippage when the gasket GS is compressed at a high tightening rate TR1 in the low-reaction first engagement step. The reaction force of the gasket GS gradually increases in the high-reaction second engagement step subsequent to the first engagement step, but the torque mechanism 80 is still free from slippage because the gasket GS is gradually compressed at a low tightening rate TR2.

In the second engagement step, the cap engagement element 20a travels over a considerable distance along the second inclined portion 20d in alignment with the opening engagement element FNc, creating an engagement state in which the opening engagement element FNc has adequate play in the direction of rotation, and preventing the fuel cap 10 from disengaging from the filler neck FN.

Accordingly, the steep first inclined portion 20c is made to conform to the contours of the opening engagement element FNc during the initial step (first engagement step) of compressing the gasket GS, whereby the gasket GS can be provided with an adequate tightening margin (and a tight seal can thus be obtained) without being subjected to a strong reaction force even when a narrow rotation angle is employed.

Another feature is that the cap engagement element 20a moves from the right to the left in the drawings during the closure of the fuel cap 10, as shown in FIGS. 14B and 14C. Because the corresponding second angle α2 of the cap engagement element 20a is greater than the first angle α1 of the opening engagement element FNc, the corner 20e of the cap engagement element 20a is not obstructed by the opening engagement element FNc when brought into contact with the opening engagement element FNc. The second inclined portion 20d is made to conform to the contours of the opening engagement element FNc with a small torque while remaining in a substantially uniform planar contact therewith, as shown in FIG. 14D. The fuel cap 10 can thus rotate smoothly without creating a large rotational torque between the first inclined portion 20c and the opening engagement element FNc. Accordingly, the fuel cap 10 can be closed with a wider rotation angle (that is, a wider tightening margin) when closed with the same rotational torque as in the prior art.

Yet another feature is that despite the fact that the cap engagement element 20a has an elaborate structure comprising a first inclined portion 20c and a second inclined portion 20d, this structure can still be easily formed with high precision by being injection-molded monolithically with the casing main body 20. A simpler formation process can therefore be employed than when such an inclined surface is machined into a metal filler neck FN.

Thus, the inclinations α1 and α2 of the guide surface 20b are appropriately set to optimum levels depending on the type of gasket or the shape of the fuel cap. When, for example, the operating angle of the fuel cap is set to 60–120° and the tightening margin of the gasket GS to 1.0–2.0 mm, the first angle α1 and the second angle α2 should be set to 3–8° and 10–45°, respectively, and preferably to 3–6° (α1) and 10–30° (α2).

The first embodiment can be modified in the following manner.

First, although the above embodiment was described with reference to a case in which a C-ring was used as a gasket, this option is nonlimiting, and an O-ring or other sealing member may also be used as long as a weak reaction force is exerted during the initial compression stage shown in FIG. 15.

Figure 16:
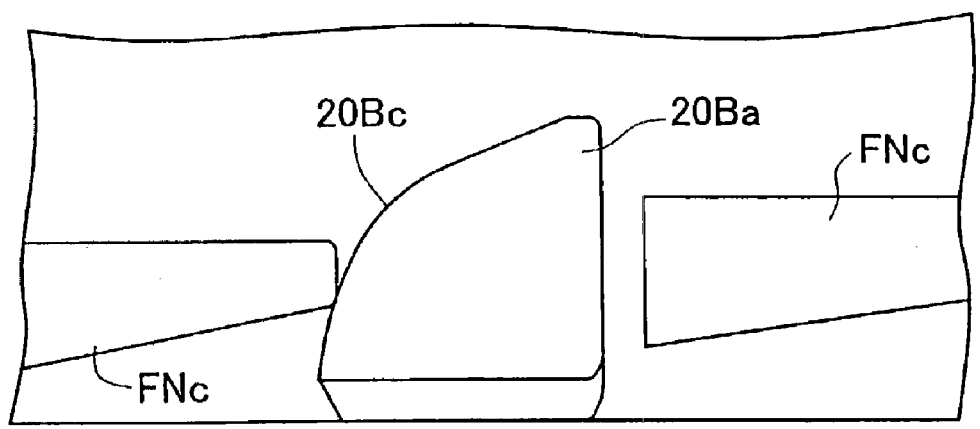
FIG. 16 is a partial enlarged side view that shows the cap engagement element pertaining to another embodiment.

Second, in addition to a rectilinearly inclined surface, a curved inclined surface 20Bc such as the one shown in FIG. 16 can be provided to a casing engagement element 20Ba as a guide surface for the casing engagement element. In particular, adopting an approach suitable for the gasket characteristics shown in FIG. 15 can make the cap very easy to operate without creating any sensation of sharp torque variations during the closure of the fuel cap.

Third, although the above embodiment was described with reference to a case in which a gasket was mounted on a fuel cap, the gasket is not limited in any particular way to this option and can be provided on the side of the filler neck as long such placement allows the movement of the fuel cap in the closing direction to create a seal for the gap around the filler neck.

Figure 17:
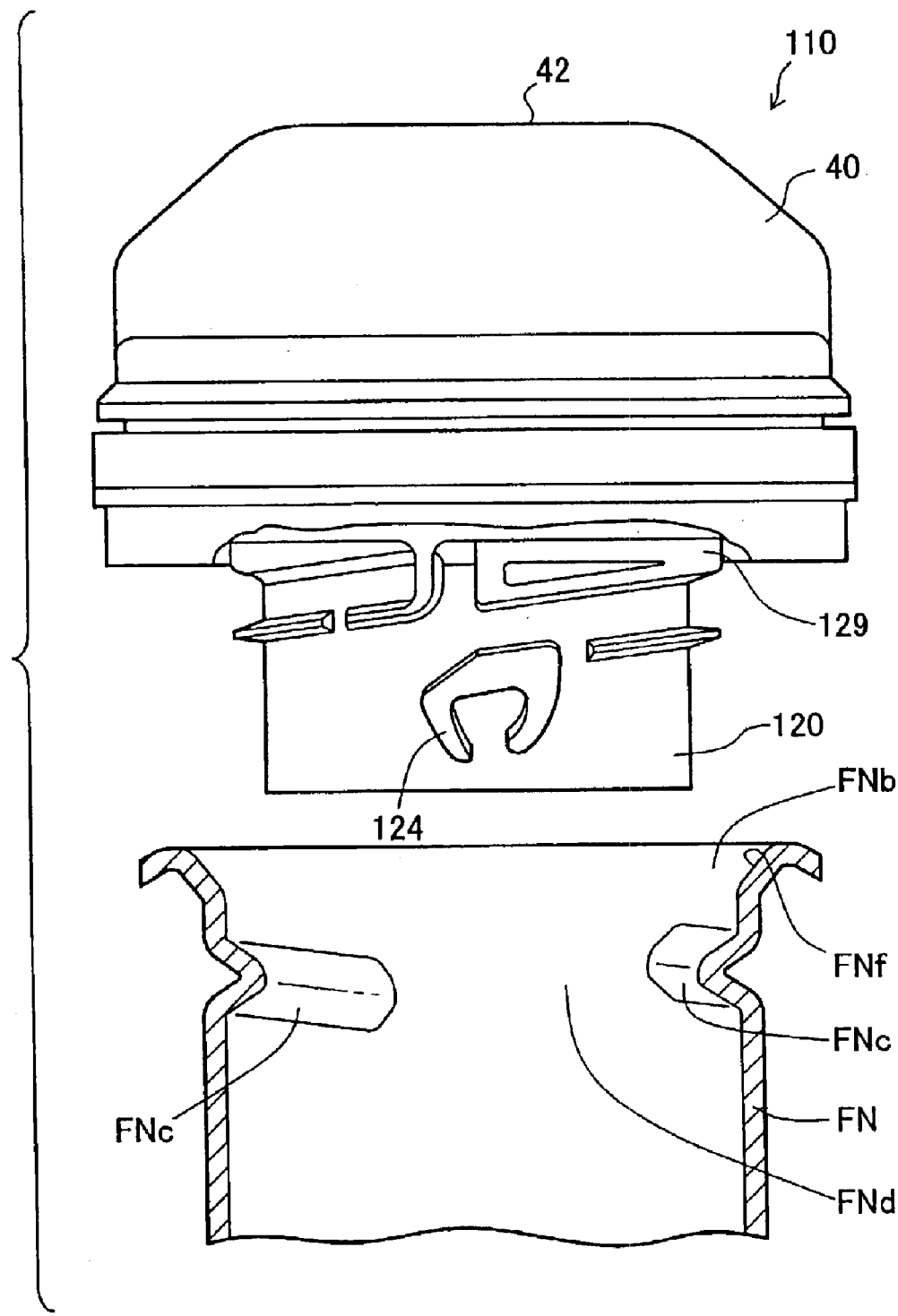
FIG. 17 is an exploded side view in partial section that shows the state existing before a fuel cap pertaining to another embodiment of the present invention is mounted over a filler neck.
Figure 18:
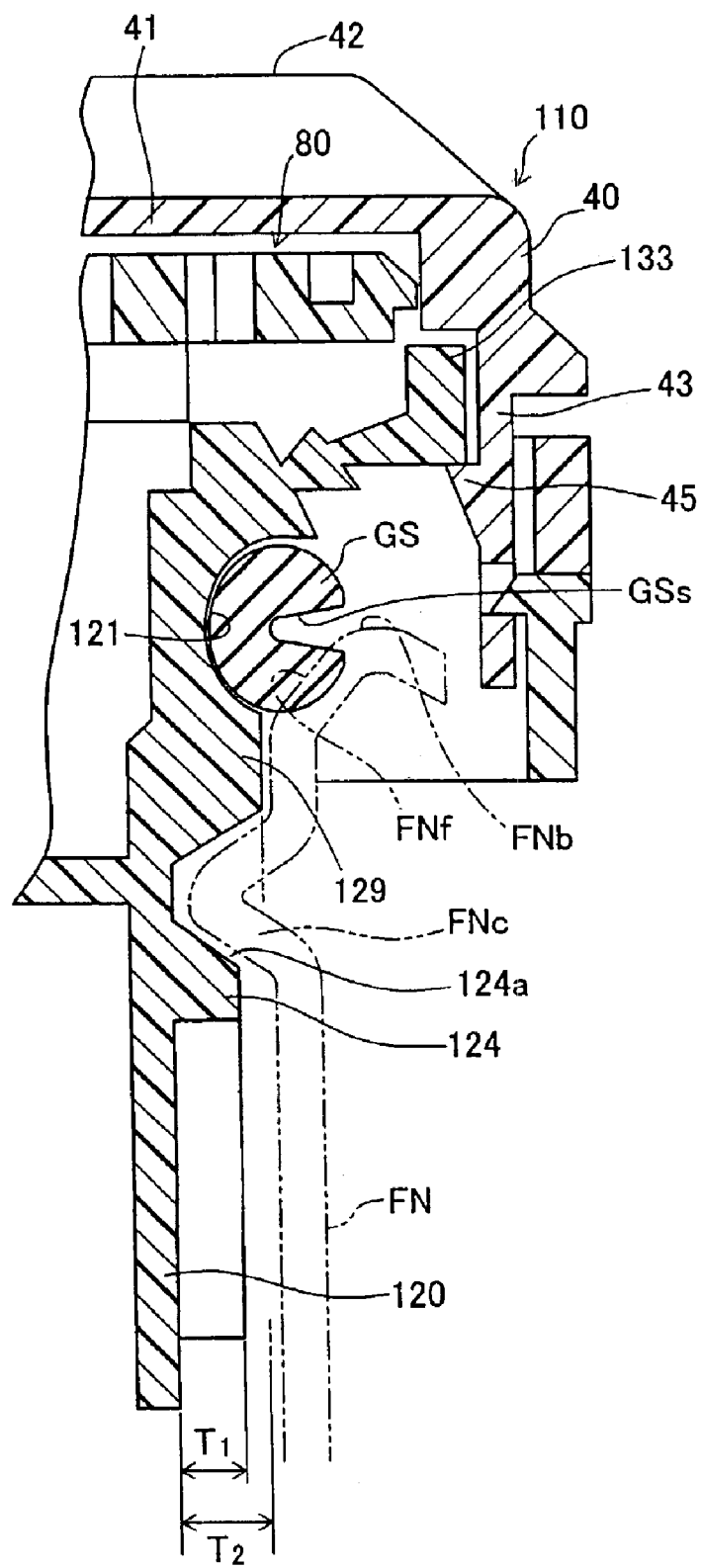
FIG. 18 is a partial enlarged cross-sectional view of the fuel cap.

FIG. 17 shows the state existing before a fuel cap 110 (tank cap) pertaining to a second embodiment of the present invention is mounted over a filler neck FN and FIG. 18 is a partial cross-sectional view of the fuel cap 110. In FIGS. 17 and 18, the fuel cap 110 is mounted over a fuel supply inlet FNb (tank opening member) for supplying fuel to the fuel tank (not shown). The fuel cap comprises a casing main body 120 preferably fashioned from polyacetal or another synthetic resin material, a cover 40 preferably fashioned from nylon or another synthetic resin material and mounted in the upper portion of the casing main body 120, a torque mechanism 80 (FIG. 18) interposed between the cover 40 and the casing main body 120, and a gasket GS (FIG. 18) mounted around the outside of the upper portion of the casing main body 120 and designed to seal the gap around the filler neck FN.

The casing main body 120 houses a positive pressure valve and a negative pressure valve as relief valves (not shown). The gasket GS is provided with a V-shaped slit GSs, is mounted in a gasket holder 121 in the upper portion of the casing main body 120, and is designed to press against a sealing surface FNf and to form a seal when the fuel cap 110 is tightened inside the fuel supply inlet FNb.

Figure 19:
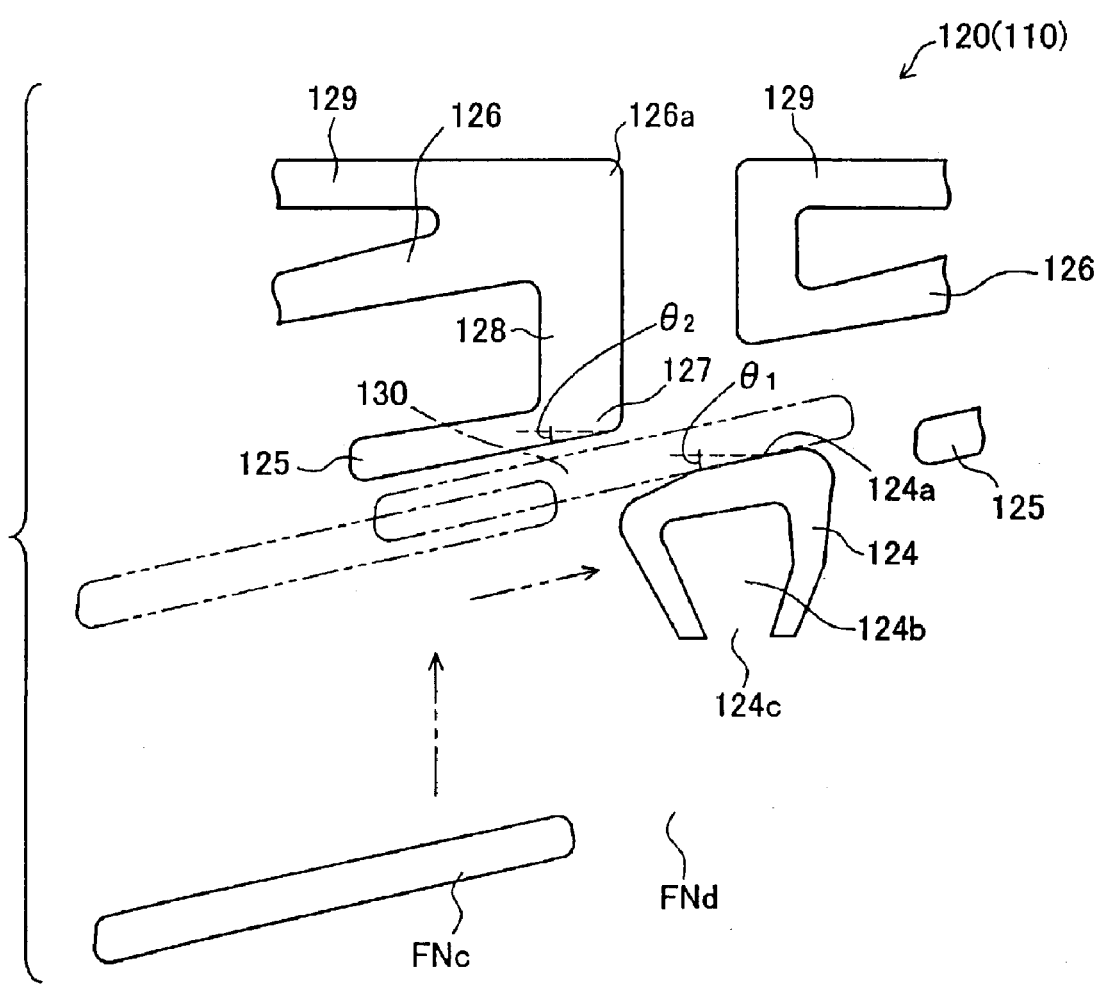
FIG. 19 is an enlarged schematic side view that shows the ribs formed on the outer circumferential surface of the casing main body.

FIG. 19 is a schematic diagram depicting the ribs formed on the outer circumferential surface of the casing main body 120. FIG. 19 depicts the ribs and the like in a form in which the components are spread out in a plane extending substantially across a semicircle around the casing main body 120. In FIG. 19, a cap engagement element 124 and mutually linked ribs are formed in the lower portion around the outside of the casing main body 120. The ribs have a monolithic structure comprising a lower guide rib 125, an upper guide rib 126, a pop-up rib 127, a stopper rib 128, and a tilt-preventing rib 129. The ribs are provided in pairs of the same size, with only one of each pair of ribs shown in FIG. 19. Of course, other configureations besides monolithic structures in pairs can be employed by varying the formation and/or number of ribs.

The cap engagement element 124, shaped as a triangular projection provided with a guide surface 124a on the top surface thereof, comprises a recess 124b with a hollowed-out central portion, and a discharge slot 124c provided below the recess 124b. The discharge slot 124c is designed to prevent fuel from accumulating in the recess 124b. The guide surface 124a is inclined downward at an angle θ1 in the clockwise direction (in the direction from right to left in the drawing) and is configured in alignment with the lower surface of the opening engagement element FNc.

The lower guide rib 125 is disposed at an incline along the guide surface 124a and is designed to guide the opening engagement element FNc. The upper guide rib 126 is disposed above the lower guide rib 125. A guide slot 130 for guiding the opening engagement element FNc is interposed between the lower guide rib 125 and the upper guide rib 126. The lower guide rib 125 and upper guide rib 126 are designed to prevent the fuel cap 110 from penetrating too deep into the filler neck FN or retreating too far from the filler neck FN when the fuel cap 110 is turned too much and the opening engagement element FNc goes into the guide slot 130. The stopper rib 128, disposed in the right-side end portion of the guide slot 130, is designed to prevent excessive rotation of the opening engagement element FNc. The lower guide rib 125 can be dispensed with in locked structures in which the cap engagement element 124 is in constant engagement with the opening engagement element FNc when the fuel cap 110 is mounted over the filler neck FN.

The pop-up rib 127 is formed as a continuation of the lower guide rib 125 and is inclined at a lesser angle θ2 than the guide surface 124a. Specifically, the components are configured such that the angle θ2 of the pop-up rib 127 is less than the angle θ1 of the guide surface 124a, whereby this configuration allows the fuel cap 110 being rotated from a closed state in the opening direction to be lifted by the opening engagement element FNc, and creates a force that moves the fuel cap 110 upward (see FIG. 21B).

The tilt-preventing rib 129 is disposed underneath the gasket GS (FIG. 18) along the upper portion of the casing main body 120 and is designed to prevent the fuel cap 110 from being tilted by the outside force applied to the fuel cap 110, as will be described below. The height T2 of the tilt-preventing rib 129 is substantially equal to or greater than the height T1 of the cap engagement element 124 in the radial direction.

The opening engagement element FNc is provided at two locations in accordance with the position of the cap engagement element 124 in the inner circumferential portion of the filler neck FN, as shown in FIGS. 17 and 19. A neck insertion notch FNd for allowing the cap engagement element 124 of the fuel cap 110 to be inserted in the axial direction is disposed in the gap formed by the opening engagement elements FNc. When the fuel cap 110 is turned by a predetermined angle (about 90°) in the clockwise direction while the cap engagement element 124 is positioned in the neck insertion notch FNd and the fuel cap 110 is inserted into the filler neck FN, the cap engagement element 124 moves along the lower surface of the opening engagement element FNc and engages the opening engagement element FNc, causing the fuel cap 110 to be mounted over the filler neck FN, as shown in FIG. 18.

Operations involved in the opening and closing of the fuel cap 110 will now be described. The fuel cap 110 can be attached to and detached from the filler neck FN by the torque mechanism 80 (FIG. 18) at a rotation angle of about 90°. The structure and operation of the torque mechanism 80 is described above.

Described first is the procedure for bringing the cap engagement element 124 into engagement with the opening engagement element FNc during the closure of the fuel cap 110. FIGS. 20A–D are diagrams depicting a series of operations for bringing the cap engagement element 124 into engagement with the opening engagement element FNc. When the fuel cap 110 is inserted into the filler neck FN, the cap engagement element 124 enters the neck insertion notch FNd. In other words, a state is reached in which the element passes through the state shown in FIG. 20A and penetrates deep into the notch in the manner shown in FIG. 20B.

Figure 20A:
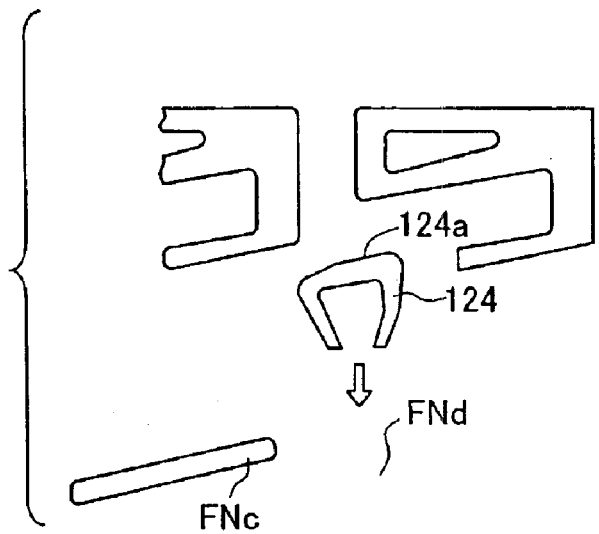
FIGS. 20A, 20B, 20C, and 20D are schematic side views that show the operations involved in the closing of the fuel cap.
Figure 20B:
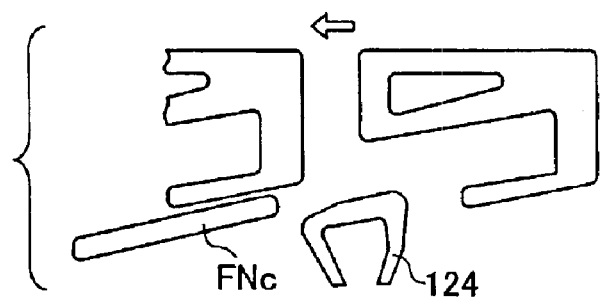
Figure 20C:
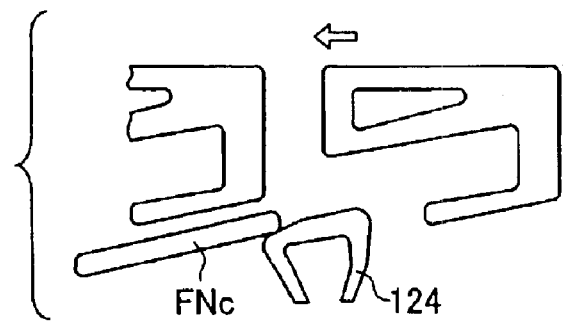
Figure 20D:
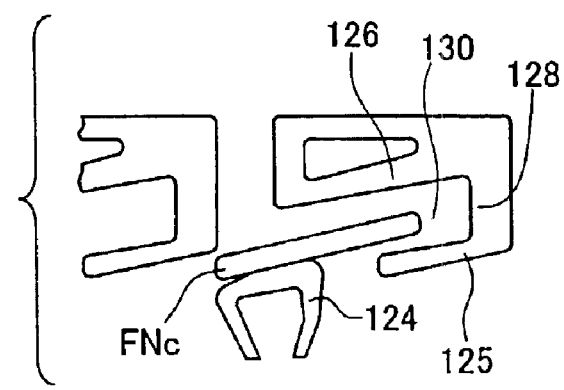

When the fuel cap 110 is subsequently rotated clockwise, the guide surface 124a of the cap engagement element 124 moves in alignment with the lower surface of the opening engagement element FNc, as shown in FIG. 20C. When the fuel cap 110 is rotated through the closing angle in the manner shown in FIG. 20D, the fuel supply inlet FNb of the filler neck FN is closed with the fuel cap 110, as shown in FIG. 18. At this time, moving the fuel cap 110 inward will cause the gasket GS to be compressed by being pressed against the sealing surface FNf of the filler neck FN. Excessive rotation of the fuel cap 110 is prevented because the fuel cap 10, even when rotated through a wide angle in the closing direction, moves along the guide slot 130 and the stopper rib 128 comes into contact with the opening engagement element FNc, as shown in FIG. 20D.

Figure 21A:
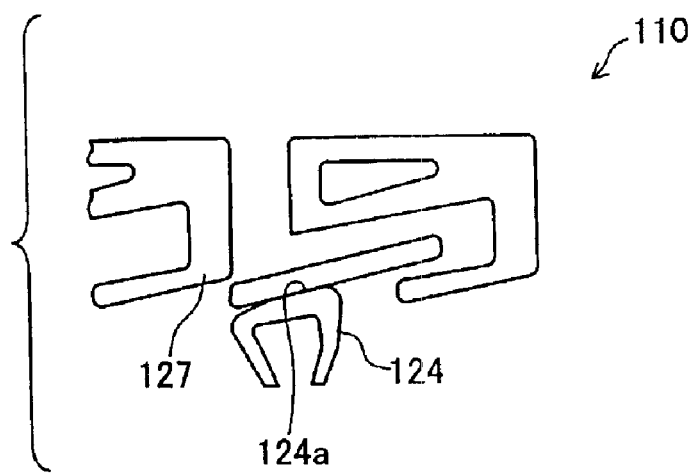
FIGS. 21A and 21B are schematic side views that show the operations involved in the opening of the fuel cap.

The operation for opening the fuel cap 110 will now be described. Rotating the fuel cap 110 counterclockwise from the state shown in FIG. 21A causes the guide surface 124a of the cap engagement element 124 to move along the lower surface of the opening engagement element FNc. In the process, the guide surface 124a is pressed against the lower surface of the opening engagement element FNc by the righting force of the gasket GS. The compressed state of the gasket GS is released when the fuel cap 110 moves upward, with the cap engagement element 124 gradually approaching the neck insertion notch FNd.

Figure 21B:
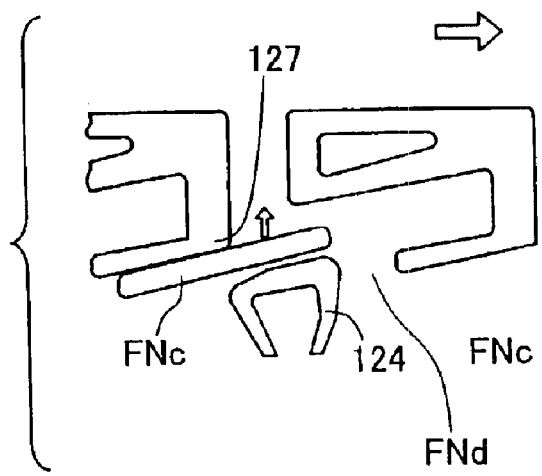

Before the cap engagement element 124 reaches the neck insertion notch FNd, the cap engagement element 124 separates from the opening engagement element FNc, and the pop-up rib 127 slides over the upper surface of the opening engagement element FNc, as shown in FIG. 21B. Specifically, the opening engagement element FNc moves from a state of engagement with the cap engagement element 124 to a state of engagement with the pop-up rib 127.

Moving the pop-up rib 127 counterclockwise along the upper surface of the opening engagement element FNc causes the fuel cap 110 move upward under the action of an upward force exerted by the opening engagement element FNc. The gasket GS shown in FIG. 18 is separated from the sealing surface FNf of the fuel supply inlet FNb by the upward movement of the fuel cap 110 during its rotation. Specifically, the gasket GS can be easily separated from the sealing surface FNf because of the concurrent action of an upward force during rotation relative to the sealing surface FNf, even when considerable negative pressure exists inside the fuel tank. Accordingly, the gasket GS remains attached to the fuel cap 110 when the fuel cap 110 is removed.

Figure 22:
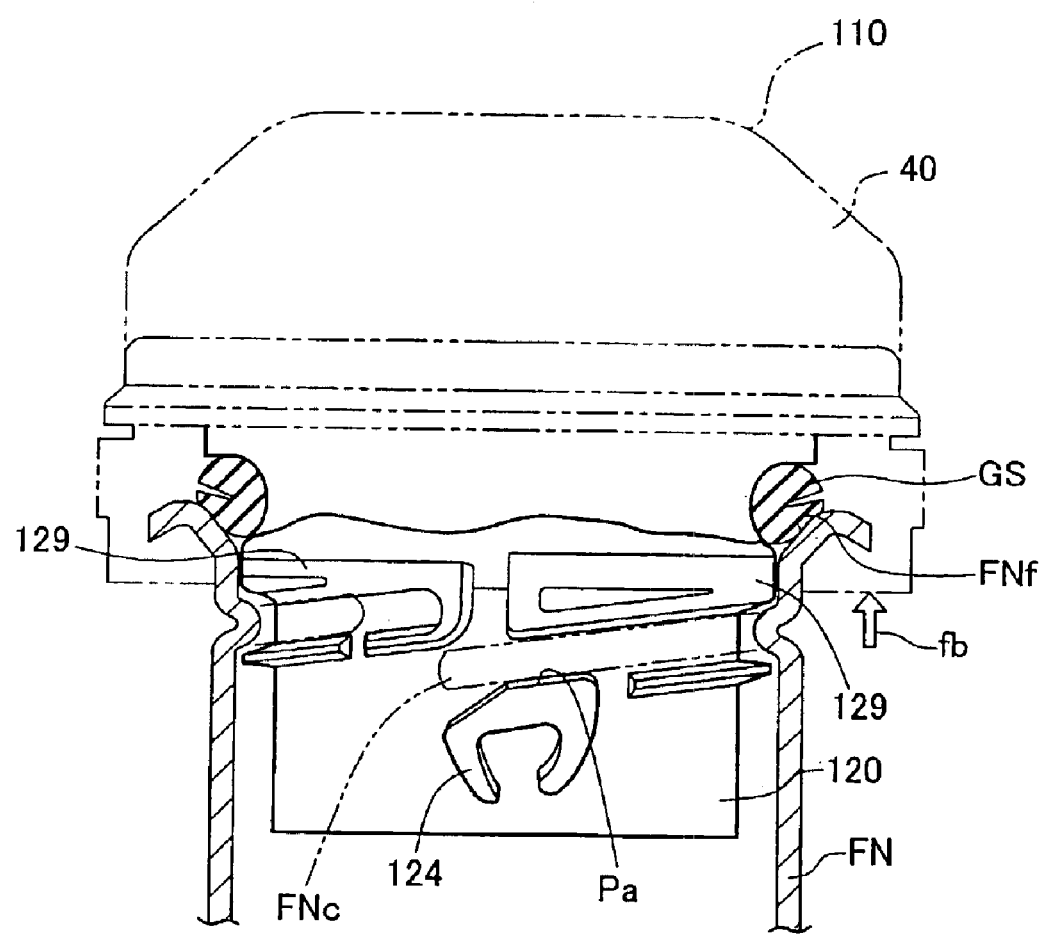
FIG. 22 is a partial side view in cross section that shows the state in which an outside force is applied to the fuel cap from below.
Figure 23:
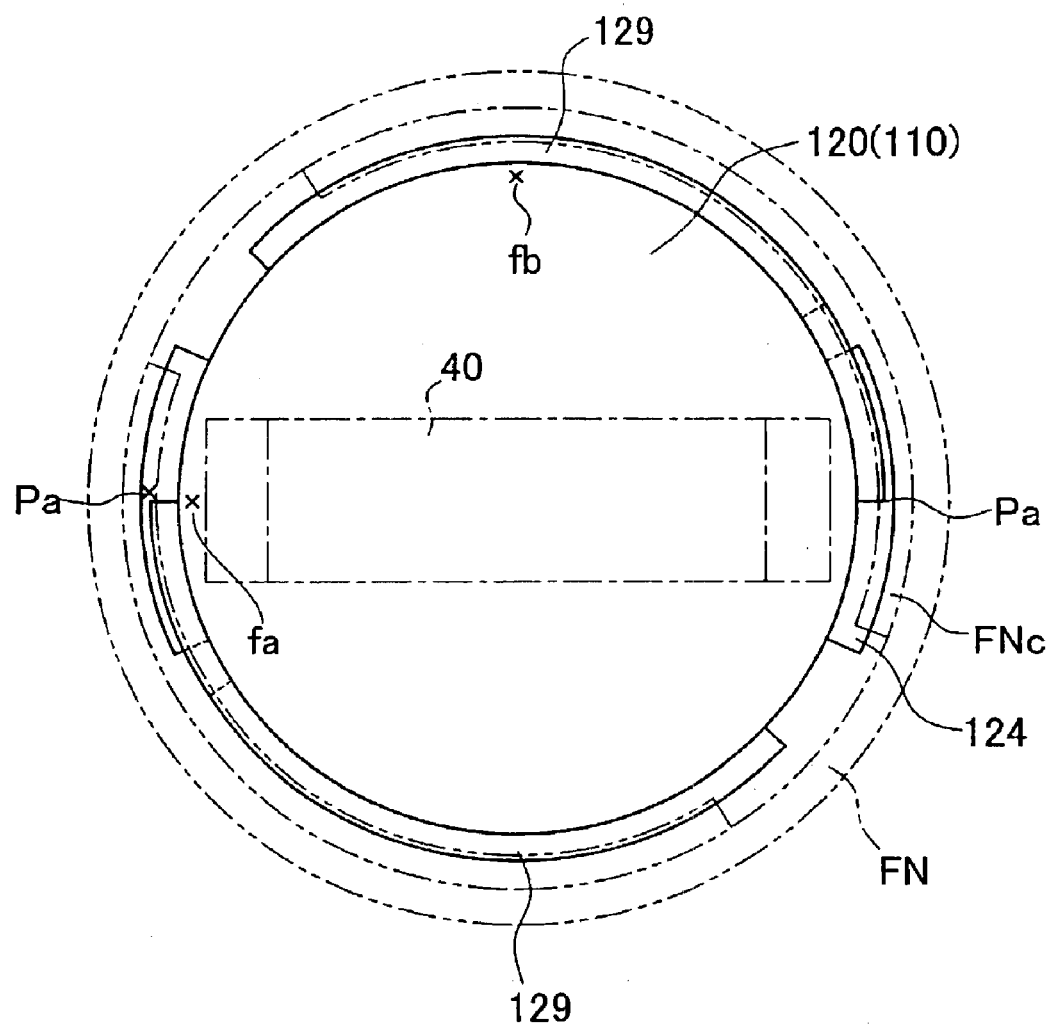
FIG. 23 is a top schematic diagram that shows the effect demonstrated by the outside force shown in FIG. 22 when this force is applied to the fuel cap.
Figure 24:
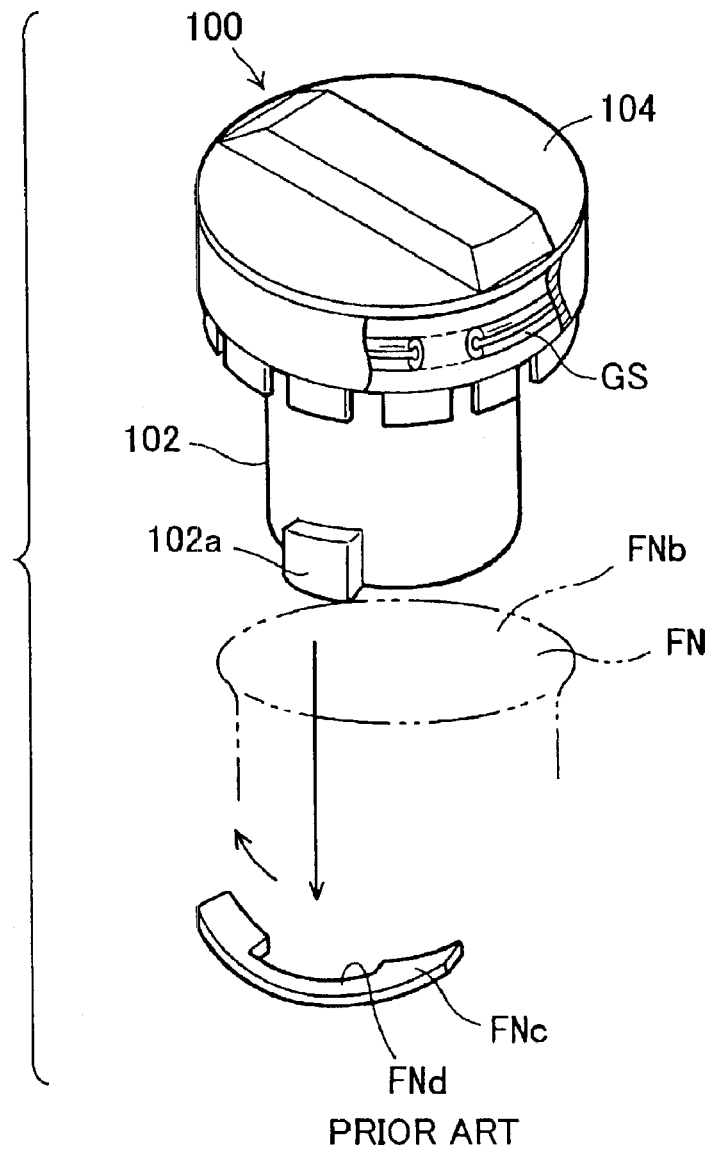
FIG. 24 is an exploded view of the state existing before a conventional fuel cap is mounted over a filler neck.
Figure 25:
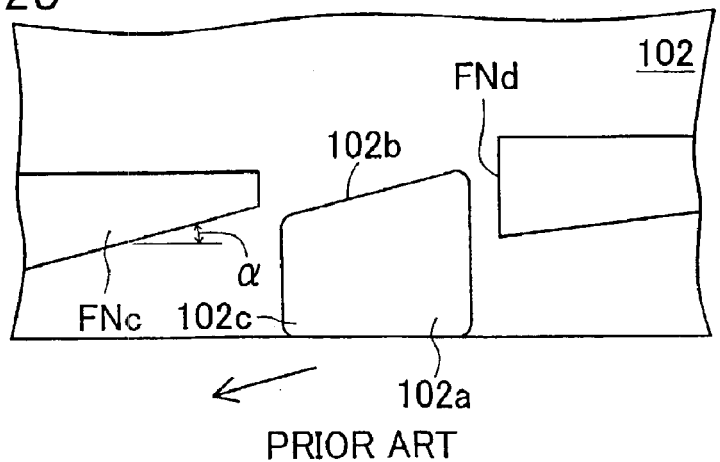
FIG. 25 is an enlarged partial side view showing the manner in which a conventional fuel cap is mounted over a filler neck.

FIG. 22 shows the state in which an outside force is applied to the fuel cap 110 from below, and FIG. 23 shows the effect demonstrated by the outside force shown in FIG. 22 when this force is applied to the fuel cap 110, with the fuel cap 110 being viewed from above. In the case of the fuel cap 110, the upward outside force fa shown in FIG. 23 is sometimes accidentally applied to the cover 40. In such cases, only a small moment is exerted relative to the cap engagement element 124, and the fuel cap 110 is prevented from tilting at a steep angle because the outside force fa is applied in the vicinity of the position Pa of engagement between the cap engagement element 124 and the opening engagement element FNc.

By contrast, applying the upward outside force fb shown in FIG. 23 will cause a substantial moment to be exerted relative to the cap engagement element 124, and a large tilting force to be applied to the fuel cap 110 because the outside force fb is applied at a distance from the position Pa of engagement between the cap engagement element 124 and the opening engagement element FNc. However, as seen in FIG. 18, the height T2 of the tilt-preventing rib 129 is greater than the height T1 of the cap engagement element 124, so the rib comes into contact with the inner wall of the filler neck FN before the cap engagement element 124 comes into contact with the inner wall of the filler neck FN, limiting the tilting of the fuel cap 110.

When the casing main body 120 is shaped as a cylinder, and the cap engagement element 124 is shaped as a projection in this manner, a gap is left between the outer circumferential surface of the casing main body 120 and the inner wall of the filler neck FN in the area not covered by the cap engagement element 124, but filling the gap with the tilt-preventing rib 129 prevents the fuel cap 110 from chattering under the action of an outside force.

In addition, the ribs can be easily formed with high precision by being injection-molded monolithically with the casing main body 120. A simpler formation process can therefore be employed than when such an inclined surface is machined into a metal filler neck FN.

The present invention is not restricted to the above embodiment, but there may be many modifications, changes, and alterations without departing from the scope or spirit of the main characteristics of the present invention. Some examples of possible modification are given below.

The embodiments discussed above relate to the tank cap for the fuel tank of the automobile. The principle of the present invention is, however, applicable to any tanks of any structures, as long as the tank opening member is closed with a cap.

What is claimed is:

1. A tank cap apparatus, comprising:
   a tank cap opening member having an opening engagement element and a sealing surface;
   a cap constructed and arranged to close the tank opening member through rotation about a rotation axis, the cap including a cap engagement element for engaging the opening engagement element; and
   a gasket interposed between the cap and the sealing surface of the tank opening member to seal a gap therebetween;
   wherein the cap engagement element is engaged with the opening engagement element by rotation of the cap by 180° or less; and
   the cap has a tilt-preventing rib formed on an outer circumferential portion thereof between the cap engagement element and the gasket, wherein at least a nortion of the tilt-preventing rib is angularly spaced from the cap engagement element such that the portion of the tilt preventing rib is not axially aligned with the can engagement element, and the tilt-preventing rib is constructed and arranged to come into contact with an inner wall of the tank opening member, thereby preventing the cap from tilting upon application of a cap-tilting force.

2. The tank cap apparatus according to claim 1, wherein the tilt preventing rib extends in a radial direction by a greater distance than the cap engagement element.

3. The tank cap apparatus according to claim 1, wherein the tilt preventing rib extends along a majority of the circumference of the cap.

4. A tank cap apparatus, comprising:
   an opening engagement element and a sealing surface, which define a tank opening;
   a cap constructed and arranged to close the tank opening through rotation about a rotation axis, the cap including a cap engagement element for engaging the opening engagement element, wherein the cap engagement element is engaged with the opening engagement element by rotation of the cap by 180° or less; and
   a gasket located between the cap and the sealing surface of the tank opening to form a seal between the sealing surface and the cap;
   a tilt-preventing rib formed on an outer circumferential portion of the cap between the cap engagement element and the gasket, wherein the tilt-preventing rib is constructed and arranged to come into contact with an inner wall of the tank opening member, thereby preventing the cap from tilting upon application of a cap-tilting force, and wherein the tilt preventing rib extends in a radial direction by a greater distance than the cap engagement element so that the tilt preventing rib comes into contact with the inner wall before the cap engagement element when the cap-tilting force is applied to the cap.

5. The tank cap apparatus according to claim 4, wherein the tilt preventing rib extends along a majority of the circumference of the cap.

6. A tank cap apparatus, comprising:
   an opening engagement element and a sealing surface, which define a tank opening;
   a cap constructed and arranged to close the tank opening through rotation about a rotation axis, the cap including a cap engagement element for engaging the opening engagement element, wherein the cap engagement element is engaged with the opening engagement element by rotation of the cap by 180° or less; and
   a gasket located between the cap and the sealing surface of the tank opening to form a seal between the sealing surface and the cap;
   a tilt-preventing rib formed on an outer circumferential portion of the cap between the cap engagement element and the gasket, wherein the tilt-preventing rib is constructed and arranged to come into contact with an inner wall of the tank opening member, thereby preventing the cap from tilting upon application of a cap-tilting force, wherein the tilt preventing rib extends along a majority of the circumference of the cap.

* * * * *